United States Patent [19]

Stalder et al.

[11] 3,860,818
[45] Jan. 14, 1975

[54] ATMOSPHERIC POLLUTION MONITOR

[75] Inventors: Arnold F. Stalder; David W. Mueller, both of Dallas, Tex.

[73] Assignee: Texas Instruments Incorporated, Dallas, Tex.

[22] Filed: Nov. 26, 1973

[21] Appl. No.: 419,003

Related U.S. Application Data

[63] Continuation of Ser. No. 248,177, April 27, 1972, abandoned.

[52] U.S. Cl............. 250/343, 250/573, 340/237 R, 356/51, 356/201, 356/206
[51] Int. Cl....................... G01n 21/26, G01n 21/34
[58] Field of Search............... 356/51, 97, 188, 201, 356/203–205; 350/274; 250/233, 343–345, 573–576; 340/227 R, 237 R, 237 P, 237 S

[56] References Cited
UNITED STATES PATENTS

| | | | |
|---|---|---|---|
| 3,588,496 | 6/1971 | Snowman............................ | 356/51 X |
| 3,790,797 | 2/1974 | Sternberg et al................... | 250/345 |

OTHER PUBLICATIONS

Berreth et al. IBM Technical Disclosure Bulletin, Vol. 8, No. 1, June 1965.

Primary Examiner—Ronald L. Wibert
Assistant Examiner—F. L. Evans
Attorney, Agent, or Firm—Harold Levine; Rene E. Grossman; Alva H. Bandy

[57] ABSTRACT

A single channel multiplexed non-dispersive optical gas monitoring system combined with an electrochemical oxygen cell is disclosed. The monitoring system includes an electromagnetic energy source; a sample chamber; an optical path from the source through the sample chamber to narrow band filters some of which are responsive to infrared active and others to visible light absorption components of a pneumatic sample passing through the sample chamber; detectors operative in the visible light and infrared ranges to provide electrical signals having strengths proportional to the amount of each component present; and a signal processing and display system to display sample information. The filters are mounted upon a rotating chopper and pass for sampling before the detectors once each revolution. The electronics system includes a multiplexer to provide a component concentration signal in near real time for each filter once each revolution of the chopper. The display includes an audible alarm and a red and green light system to indicate, respectively, unacceptable and acceptable gas conditions, and a meter indicating the concentration of desired compounds.

3 Claims, 17 Drawing Figures

PREAMPLIFIERS
118 OR 126

SAMPLE & HOLD CIRCUITS

LOG/DIFFERENCE AMPLIFIER

FILTER & THRESHOLD DETECTOR CIRCUIT

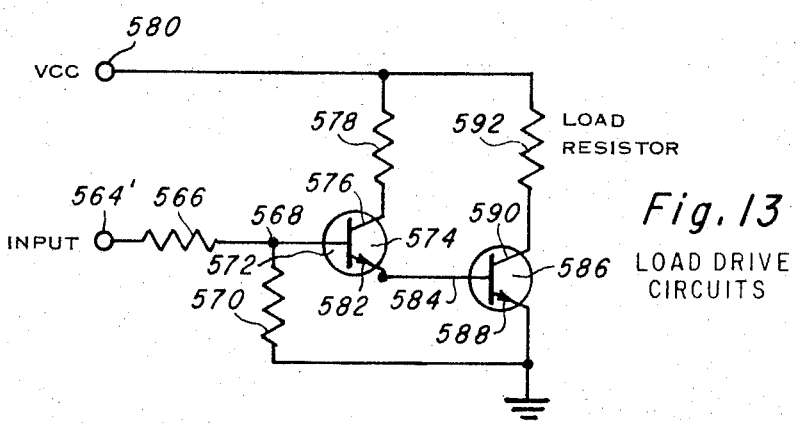
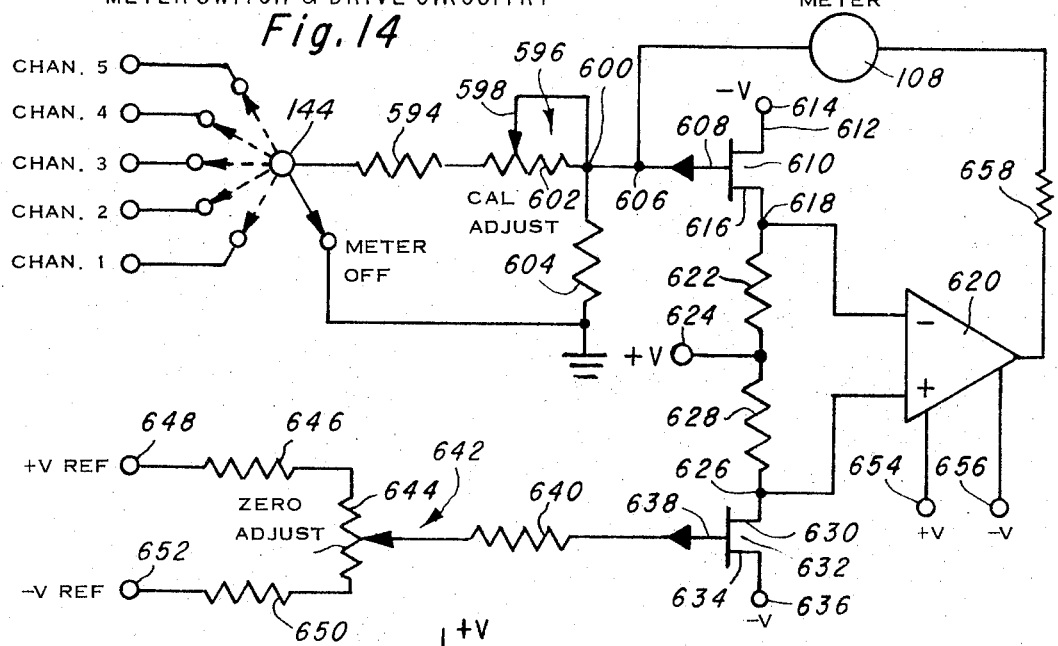
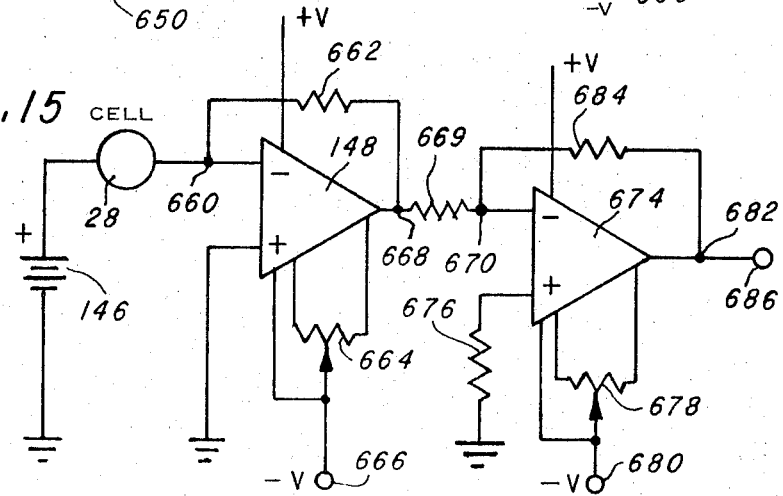

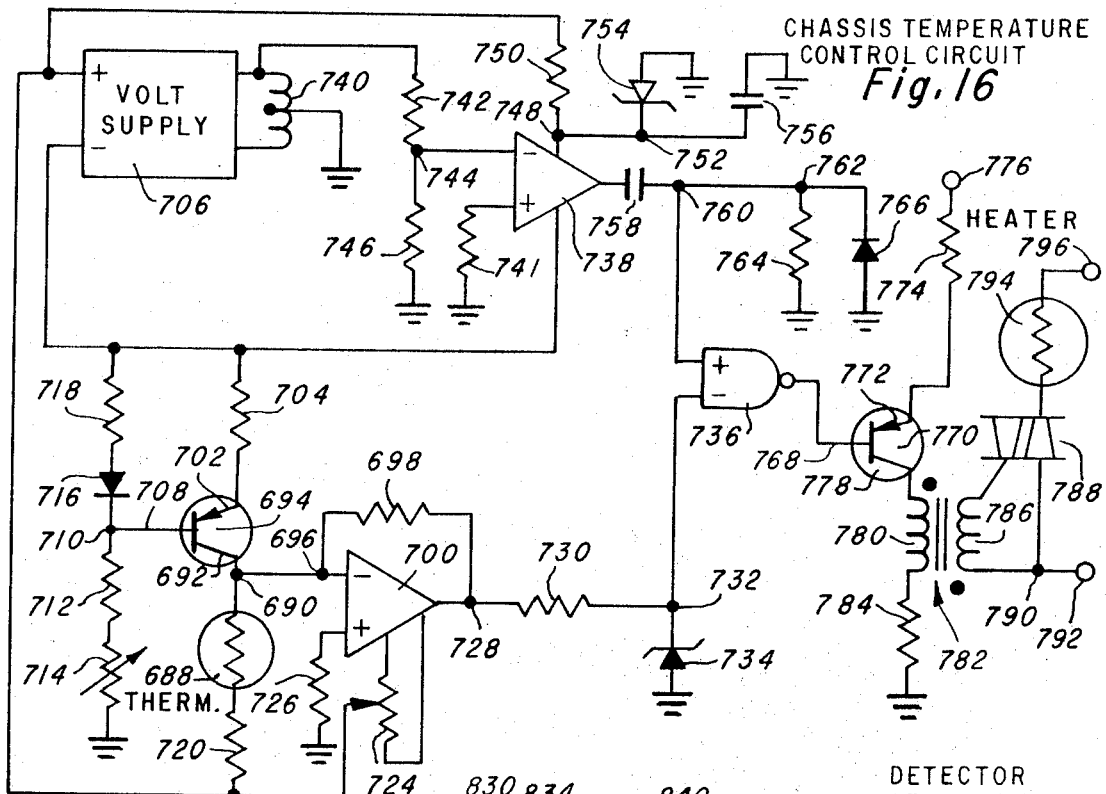
Fig. 16 CHASSIS TEMPERATURE CONTROL CIRCUIT
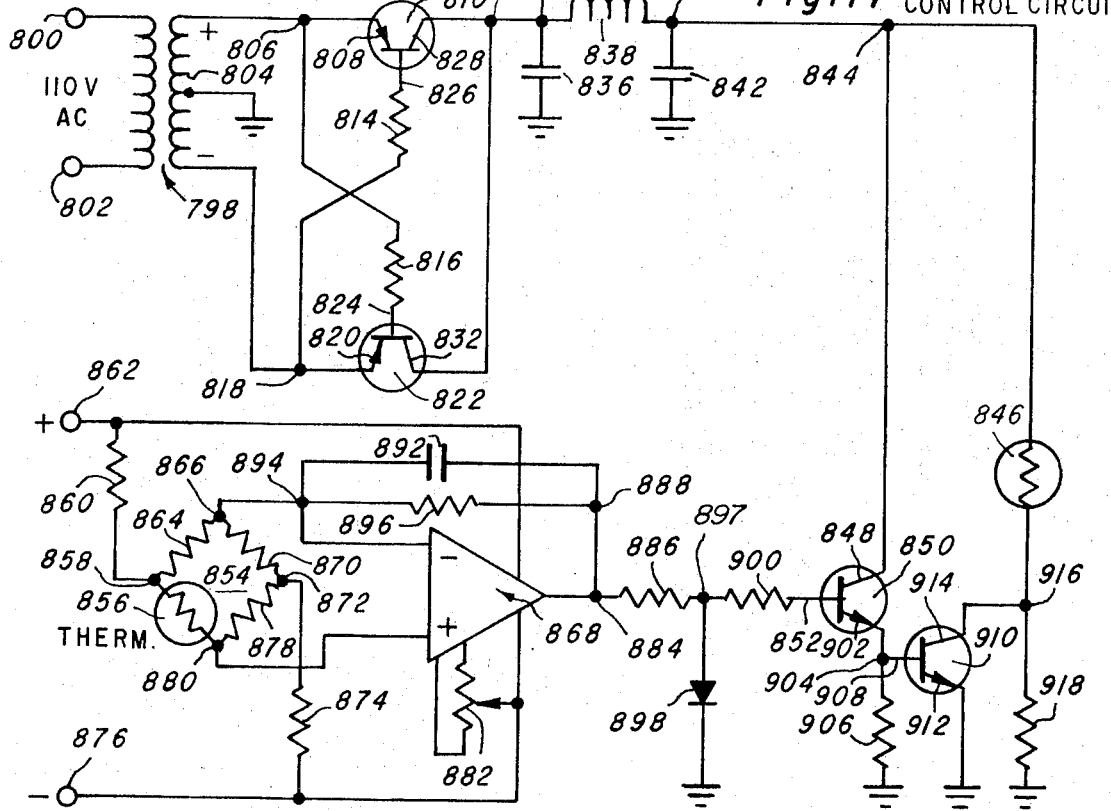
Fig. 17 DETECTOR TEMPERATURE CONTROL CIRCUIT 3,860,818

ATMOSPHERIC POLLUTION MONITOR

This is a continuation of application Ser. No. 248,177, filed Apr. 27, 1972, now abandoned.

BACKGROUND OF THE INVENTION

1. Field of the Invention

This invention relates to fluid monitoring systems and more particularly to a fluid monitoring system for determining the concentration of various components of an air or liquid sample.

2. Description of the Prior Art

The concentration of various gaseous compounds composing the atmosphere at a particular location has become a matter of concern to public health, safety and welfare. The levels that need to be monitored vary from the percent level for constituents such as oxygen, to low parts per billion levels for gases such as sulfur dioxide. The available analytical techniques encompass a wide variety of characteristics, and few, if any, can be said to be of universal application. Commonly used analytical techniques include wet chemistry, thermochemistry, gas chromatography, mass spectroscopy, high resolution optical spectroscopy, Fourier transform spectroscopy, Hadamard transform spectroscopy, non-dispersive spectroscopy, microwave and magnetic spin resonance, and electrochemistry. Each of these techniques as practiced today have disadvantages, for example: wet chemistry requires long periods for sample collection for use in equipment which cannot be automated; thermochemistry requires time consuming techniques for separation of the compounds; gas chromatography requires the availability of carrier gases; low resolution mass spectroscopy requires skilled operators and is unable to distinguish carbon monoxide (CO) from nitrogen ($N_2$); high resolution optical spectroscopy requires the ruggedization of bulky laboratory type equipment as does the Fourier transform spectroscopy and the Hadamard transform spectroscopy techniques; and most of the non-dispersive spectroscopy equipment available requires a separate optical system for each compound to be measured making it necessary to stack the optical hardware which makes the equipment excessively bulky and expensive.

SUMMARY OF THE INVENTION

It is an object of the embodiment of the invention to provide an improved non-dispersive fluid monitoring system which is simple and economical to operate.

It is another object of the embodiment of the invention to provide a fluid monitoring system which is reliable over long periods of time.

It is still another object of the invention to provide a multiplexed non-dispersive fluid monitoring system which is easily calibrated and maintained to display in near real time the concentrations of selected components of a fluid sample.

It is a further object of this invention to provide an air monitoring system which is particularly adapted for use in explosion sensitive areas such as mines, tunnels, mills, and the like.

It is still a further object to provide a fluid monitor which is compact in size and rugged in construction.

The embodiment of the invention is for use in detecting and measuring desired gaseous components of an air sample. The principle used for detection of the components and their measurement is resonance absorption and the application of Beer's law where applicable. Beer's law relates the intensity (I) at the resonance frequency to the intensity ($I_o$) when no absorbers are present as follows:

$$I = I_o\, e^{-ECL} \tag{1}$$

where E is the effective extinction coefficient for the system used, L is the path length, and C is the absorber concentration. For low levels of concentration extinction coefficient, or path length, such that $ECL < 0.1$, the exponential term can be expanded into an infinite series and terminated beyond the first order term, i.e., $$e^{-ECL} = [1 - ECL + (ECL)^2/2 - (ECL)^3/6 + \ldots] \approx 1 - ECL \tag{2}$$

In this case, substituting into Eq. 1 gives $$I_o - I \approx ECL \tag{3}$$

When $ECL \geq \geq 0.1$, the exponential can't be so easily eliminated, but $$\ln(I_o/I) = \ln I_o - \ln I = ECL. \tag{4}$$

Equations 3 and 4 can be electronically implemented in accordance with the embodiment of this invention. Although the embodiment of the invention is applicable to the detection of gaseous components and the measurement of the concentration of any gases exhibiting resonance absorption, one preferred embodiment is for use as a mine air monitoring system. Thus the element and compounds of interest to personnel health and safety which should be detected and their concentrations measured are oxygen ($O_2$), carbon monoxide (CO), carbon dioxide ($CO_2$), nitrogen dioxide ($NO_2$), and methane ($CH_4$). Except for oxygen, these gases are detected by determining whether there is activity in their respective resonance absorption bands or regions; the concentrations of these gases to be measured must include their critical concentrations; i.e., the concentrations which will produce explosions or be hostile to personnel. TABLE I below sets forth the wavelengths ($\lambda$ values), critical concentration levels and method of detection used in the embodiment of the invention for the gases of interest. The reference signal ($\lambda$ reference) is included for a purpose hereinafter described; it is located in a bandwidth close to the sample regions of the gases but where no sample absorption and no interfering absorption from any other species occur.

TABLE I

| CRITICAL CONCENTRATION LEVELS OF MINE GASES | | | | |
|---|---|---|---|---|
| Gas | Sample $\lambda$ | Reference $\lambda$ | Conc. | Method |
| $CH_4$ | $3.4\mu$ | 4.0 | $<5.3^a$ | IR |
| CO | $4.6\mu$ | 4.0 | $<50\text{ppm}^b$ | IR |
| $CO_2$ | $4.3\mu$ | 4.0 | $<5000\text{ppm}^b$ | IR |
| $NO_2$ | 4880A°, 4358A° | 6328A° | $<5\text{ppm}^b$ | VIS |
| $O_2$ | — | — | $>16\%^c$ | Elec. |

Briefly stated the embodiment of the invention which implements the above-mentioned resonance absorption principle comprises a compact, rugged, portable, single channel, multiplexed non-dispersive gas monitor comprising electro-optical system. The optical portion of the system includes a suitable light source producing electromagnetic wave radiation directed by a White optical system of a known path length through a sample chamber and through each of a plurality of narrow bandpass filters mounted in a rotatable filter/chopper to a beamsplitter which sends such energy in the visible region (for $NO_2$ and visible light reference filters) to one detector and such energy in the infrared region ($CH_4$, $CO$, $CO_2$ and IR reference filters) to another detector. The detectors generate electrical sample signals and reference signals including baseline reference signals and filter reference signals for the electrical portion of the system. The sample signals are automatically adjusted by the baseline reference signals for baseline drift, and the adjusted signals compared with the appropriate filter reference signal to obtain a difference signal representative of the concentration of the sampled components of the gas sample. The concentration signals are multiplexed and electrically interconnected to an alarm and display system for display in near real time. TABLE II shows the approximate values of minimum detectable concentration, $C_{Min}$, for the gases in various pathlength cells using narrow bandpass filters to isolate the resonance absorption lines.

TABLE II

GASES IN VARIOUS PATHLENGTH CELLS
$C_{Min}$ (ppm)

| $l(cm) =$ | 10 | 100 | 1000 |
|---|---|---|---|
| GASES | | | |
| CO | 3.3 | .33 | .033 |
| $CO_2$ | 1.0 | .10 | .010 |
| $CH_4$ | 3.3 | .33 | .033 |
| $NO_2$ | 0.1 | .01 | .001 |

In addition to the above-mentioned light monitor, two auxiliary monitors are included. First, the level of oxygen ($O_2$) is measured with an electrochemical cell and electrically converted to a concentration scale. Secondly, the level of humidity can be measured either by an ordinary humidistat to give a water ($H_2O$) correction constant, or by its infrared absorption at 1.4, 1.8, or 2.7$\mu$m.

Other objects and many of the attendant advantages of this invention will become better understood by reference to the following detailed description when read in conjunction with the accompanying drawings and wherein:

FIG. 13 is a schematic diagram of the driver circuits for the alarm displays.

FIG. 14 is a schematic diagram of the meter drive circuit and meter input switch.

FIG. 15 is a schematic diagram of the transimpedance amplifier for the oxygen monitoring cell.

FIG. 16 is a schematic diagram of a chassis temperature regulator utilized in the embodiment of the invention.

FIG. 17 is a schematic diagram of the detector temperature regulator utilized in the embodiment of the invention.

PREFERRED EMBODIMENT

Figure 1:
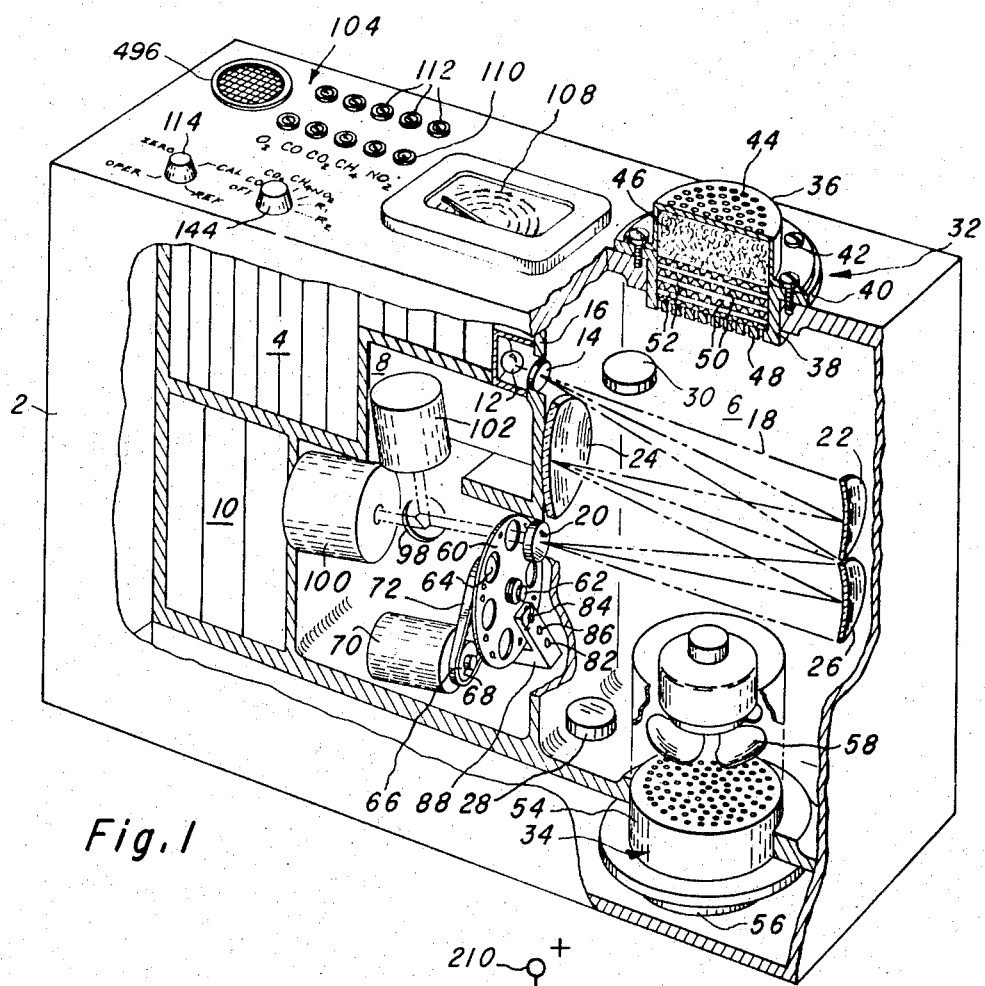
FIG. 1 is an isometric view of the mine air monitor having a portion of the housing broken away to show the arrangement of the mine air monitor.

Referring to the drawings, the air monitor construction (FIG. 1) of the present invention comprises a compartmentalized housing 2 constructed of, for example, aluminum or aluminum alloys having less than 0.5 percent magnesium. The housing 2 has an electronics compartment 4, a sampling chamber 6 including a detector and optics package 8, and a power supply compartment 10. The electronics compartment 4 is adapted to receive printed circuit boards with the circuitry hereinafter described, and a suitable light source 12 which is, for example, a quartz-iodine light which emits strongly in the visible and near IR band. D.C. power is used to activate the light source lamp in order to prevent line frequency modulation entering data signals hereinafter described. The light source 12 being a heat generator is shielded, finned, and equipped with a heat sink, using structures well known to those skilled in the art and which need not be described further; to limit local temperatures and if necessary for thermal control, a local blower (not shown) may be included. The light source 12 is directed through a lens 14 supported in an aperture in partition 16. The partition 16 separates the electronics compartment 4 from the sample chamber 6.

The sample chamber 6 (FIG. 1) houses a White multipass mirror system 18 which forms the meter length optical path from lens 14 through the sample chamber 6 to a lens 20 which also acts as a window forming a light passage into the detector and optics package 8. The White multipass mirror system 18 comprises three spherical concave mirrors 22, 24 and 26 with the same radius of curvature. The centers of curvature of mirrors 22 and 26 lie on the front surface of mirror 24 and the center of curvature of mirror 24 lies halfway between mirrors 22 and 26. In this arrangement mirror 22 reflects light from the light source 12 to mirror 24, and mirror 26 reflects the light from mirror 24 to the lens 20. In this configuration the system yields four passes before being imaged at lens 20. If mirrors 22 and 26 are symmetrically adjusted in angle to bring their centers of curvature closer together certain angular positions meet the conditions for multipass geometry. The second condition beyond the simplest configuration is that of three reflections at mirror 24 and two reflections each at mirrors 22 and 26 for a total of eight passes. Thus, optical paths of different lengths may be obtained. The lens 14 and 20 must be capable of transmitting 4,880A through 4.6μ. Although several materials meet this qualification calcium flouride ($CaF_2$) is considered the most suitable. In addition the lenses are coated to minimize front surface losses and to optimize transmission within the range of spectral interest, and the mirrors of the White multipass mirror system are silvered with aluminum and coated with aluminum oxide to maximize reflections at wavelengths of interest. For the detection and concentration measurement of oxygen, an electrochemical galvanic cell 28 is mounted in the sample compartment 6. Several commercial oxygen detection cells such as, for example, Technology Inc., Model PO-160-L, are available, however, oxygen cell 28 is a basic galvanic cell which is biased to a low potential to insure reduction of only the cell oxygen. The bias current which is directly proportional to the oxygen concentration will be in the range of 0.1 to 10 micro-amperes. Thus, a simple measure of the cell current indicates the percentage of oxygen in the sample chamber 6.

To determine the humidity of the air sample a humidistat 30 is mounted in the sample chamber to provide a concentration correction signal to the CO and $N_2O$ signals in a threshold detection circuit hereinafter described. The humidistat 30 may be, for example, a PCRC-55 manufactured by Phys-Chemical Research Corp., but other humidistats are commercially available and as this structure is well known to those skilled in the art it need not be described in further detail. A continuous air sample is drawn into the sample chamber 6 through an air inlet port 32 (FIG. 1) and an exhaust port 34 which are especially designed to reduce to a minimum any flame escaping from the chamber. The air inlet port 32 comprises a flanged filter cup 36, and a flanged flame retarder cup 38 separated by a flanged perforated partition member 40. Flanged cup 38 is inserted in an aperture provided therefor in the housing 2 and flanged partition member 40, together with the filter cup 36, are placed over the flame retarder cup 38 and secured to the housing 2 by bolts 42 passing through the flanges into threaded apertures provided in the housing 2. The filter cup 36 has a perforated base 44 and contains a suitable filter 46 which may be, for example, a plastic foam type filter. The flame retarding cup 38 has a perforated bottom 48 and contains a plurality of screen disks 50, each disk 50 is separated by a perforated plate 52. The flanged perforated partition member 40 permits air to be drawn through the filter cup 36 and flame retarding cup 38 into the sample chamber 6. The exhaust port 34 is provided in the wall of the housing 2 opposite the air input port 32. The exhaust port 34 is constructed substantially the same as the air input port 32 in that it includes a flame retarding cup 54 identical in construction to that of the input port. The filter 56 is different and may be of any fiber type suitable for use with an exhaust fan. An exhaust fan 58 is attached to the exhaust port to draw the air sample into and out of the sample chamber 6. A space for the detector and optics package 8 completes the L shaped sample chamber 6.

The detector and optics package 8 (FIGS. 1 and 2) includes a filter/chopper wheel 60 mounted on one end of a centrally disposed shaft 62 supported in bearings (not shown) attached to housing 2. A pulley 64 is mounted on the other end of shaft 62 and is connected to a pulley 66 mounted on the armature 68 of a sychronous motor 70 by a rib belt 72. The synchronous motor 70 preferably turns at 1,800 rpm and the pulleys 64 and 66 are sized to produce a 47 to 30 ratio to rotate the filter/chopper wheel 60 at 2,820 rpm (47 Hz). This rate is preferred because it avoids 60 Hz interference and maximizes the life of the bearings used in the filter/chopper wheel drive system.

The filter/chopper wheel 60 (FIG. 2) contains 6 filters 73, 74, 75, 76, 77, and 78 equally spaced one from the other and from the hub 80 of shaft 62 to provide between each filter a space for base line sampling of the filter/chopper wheel which is approximately equal to that available for signal sampling. The diameter of each filter is such that the aperture of the energy impinging thereon is approximately one-third the diameter of the filter to insure sampling at the top of a square wave or spike-flat top control signal, hereinafter described in more detail, to obtain constantly accurate sampling. The filters used in the infrared frequency range will have half intensity widths of 0.15 micron, and those used in the visible frequency range about 30A centered about the strong absorption wavelengths for the component filters and the non-absorbing regions of the reference filters. That is: the visible reference filter 73 is ± 15A at the 6,328A center frequency; the carbon monoxide filter 74 is ±0.075μ at the 4.6μ center frequency; the $CO_2$ filter 75 is ± 0.075μ at the 4.3μ center frequency; the nitrogen dioxide filter 76 is ± 15A at the 4,880A or 4,358A center frequency; the IR reference filter 77 is ± 0.075μ at the 4.00μ center frequency and the methane filter 78 is ± 0.075μ at 3.4μ center frequency.

Electrical signals for multiplexing the opto-electronic system for sampling the filter/chopper wheel 60 and its filters are obtained by an aperture arrangement in the filter/chopper wheel 60 coacting with a filter/chopper wheel yoke carrying light sources and transducers hereinafter explained. A plurality of start and stop holes 82 are positioned adjacent the periphery of the filter/chopper wheel 60; these holes 82 are positioned in pairs between each filter to provide timing signals for a sampling of the filter/chopper wheel 60 immediately prior to the sampling of the following filter to provide the base line signal. A corresponding plurality of start and stop holes 84 are positioned adjacent the hub 80; these holes 84 are positioned in pairs in relation to each filter to provide start and stop signals for a sampling of each filter of the filter/chopper wheel 60. A synchronization hole 86 is provided in the filter/chopper wheel 60 intermediate the start and stop holes 82 and 84 and after filter 73 to provide a synchronization signal for resetting the associated control electronics each revolution of the wheel 60. The hole 86 is so positioned to provide the reset signal at the proper instant for recycling the sampling procedure. These apertures 82, 84 and 86 coact with light sources and light source detectors of a filter/chopper wheel yoke 88 for the filter/chopper wheel 60 to provide multiplexing signals as hereinafter described. The chopper yoke 88 (FIGS. 1 and 8) is attached to the monitor housing wall so that the portion of filter/chopper wheel 60 carrying the start and stop holes 82 and 84 and the synchronization hole 86 extend between its bifurcations 90 and 92. The bifurcations 90 and 92 (FIG. 8) are provided with passages 118, 120, and 122 and 118', 120' and 122', respectively, which are aligned with the plurality of start and stop holes 82 and 84 and the synchronization hole 86 when they pass through the bifurcations 90 and 92 of yoke 88. To simplify the yoke construction, the chopper yoke 88 is located out of the optical path passing from the signal aperture 20. Thus, the chopper holes associated with a given filter will be located away from the filter although they need not be necessarily 180° away. Yoke bifurcation 90 includes light sources 94 mounted respectively in passageways 118, 120, and 122; and yoke bifurcation 92 includes as transducers phototransistors 96 mounted in passageways 118', 120', and 122' respectively. This light system provides the operation control or multiplexing signals as hereinafter described in connection with the control unit of the system.

The optical path (FIG. 1) of the electromagnetic wave output continues from the filter/chopper wheel 60 to a beam splitter 98 to reflect the high percentage of visible light to a detector 102 while transmitting a high percentage of the incident infrared to detector 100. The normally used beamsplitter angle of 45° may be varied to optimize the visible/infrared separation. Infrared light detector 100 (FIG. 1) may be constructed of any suitable material operative in the frequency range desired. For mine air monitoring, a lead selenide (PbSe) photoconductive detector is used as its frequency range extends out beyond the $4.6\mu$ band which covers the IR absorption regions of carbon monoxide ($4.6\mu$), carbon dioxide ($4.3\mu$), methane ($3.4\mu$) and the window reference $4.0\mu$. The infrared detector 100 is cooled by a cooling system (not shown) to obtain required sensitivity. A suitable detector is Opto-Electronics Model OTC-12 which contains a built in thermal electronic cooler which will satisfy the detector cooling requirement. The visible light detector 102 may be, for example, a silicon photovoltaic detector which will measure the nitrogen dioxide ($NO_2$) absorption at 4,880A and the shortwave reference level in the 6,328A window. A power supply compartment 10 having a power inlet (not shown) completes the construction of the interior of the air monitor housing 2.

An indicator and control panel 104 is recessedly mounted in the outer wall of the monitor housing adjacent the electronics compartment 4. The panel 104 (FIG. 1) comprises the meter switch selector knob 144, meter 108, green lights 110, red lights 112, test control knob 114 and audible alarm speaker 496 which are responsive to the electronic circuits hereinafter described.

The circuit boards of the electronics compartment 4, contain the electronic circuits now described. The outputs of visible light photodetector 102 (FIG. 3) are coupled to a preamplifier 118 whose base-line signal outputs are to a sample and hold circuit 120, and whose reference and $NO_2$ sampling signal outputs are, respectively, to sample and hold circuits 122 and 124. Similarly, the electrical outputs of IR detector 100 are to preamplifier 126 whose base-line signal outputs are connected to sample and hold circuit 128, and whose reference and CO, $CO_2$, and $CH_4$ signal outputs are, respectively, to sample and hold circuits 130, 131, 132, and 133. The sample and hold circuits 120 and 128 upon receipt of control pulses from the control unit provide inputs, respectively, to sample and hold circuits 122 and 124; and to sample and hold circuits 130 through 133.

It has been determined that for CO and $NO_2$ the exponential (−ECL) of equation (1) may be linearly approximated by the first two terms of the Taylor series expansion. Thus, by taking the difference between the reference signal and the sample, a signal is produced which is proportional to the concentration. Hence, a difference amplifier is used to determine the concentration of the CO and $NO_2$ gases. For the gases $CO_2$ and $CH_4$, neither the linear approximation, nor the logarithmic expression in equation 4 hold true. Thus either a difference amplifier, or the described log difference amplifiers may be used with their outputs, which are only proportional to the concentrations, correlated by the meter scale to display the concentrations of $CO_2$ and $CH_4$. Hence, difference amplifier 134, and log and difference amplifiers 136 and 138 receive as one input reference signals from sample and hold circuit 130 when triggered by a signal from the control unit; and difference amplifier 140 receives as one input a reference signal from sample and hold circuit 122. Sample and hold circuits 131, 132, 133, and 124 are then sequentially triggered by the control unit to provide second inputs to the difference amplifiers and log and difference amplifiers as follows: sample and hold circuit 131 provides a carbon monoxide indicative signal to the difference amplifier 134; sample and hold circuit 132 provides a carbon dioxide indicative signal to the log and difference amplifier 136; sample and hold circuit 133 provides a methane indicative signal to the log and difference amplifier 138; and sample and hold circuit 124 provides a $NO_2$ indicative signal to difference amplifier 140. The output signals of difference amplifiers 134 and 140 and log and difference amplifiers 136 and 138 are signals representing the concentrations respectively of carbon monoxide (not corrected for $H_2O$ effects), nitrogen dioxide, carbon dioxide, and methane. The carbon monoxide signal from amplifier 134 is fed to water vapor correction amplifier 141, and the signals from amplifiers 141, 136, 138, and 140 are provided as inputs to threshold detection and display circuits 142 and terminals of a six way switch 144. As the filter/chopper wheel 60 makes 47 revolutions per second, each component of the sample is sampled 47 times per second.

Referring to the auxiliary circuit (FIG. 3) used to measure the oxygen concentration of the air sample, the oxygen monitor circuit includes the oxygen cell 28. The cell 28 may be one of many which are available on the commercial market, such as, for example, Technology Incorporated, Model PO–160L. Cell 28 is connected to a biasing source of power 146. The output of the electrochemical cell 28 is high impedance level so that operational amplifier 148 connected in a transimpedance or current mode directly monitors the current. The oxygen reduction current through the cell 28 is balanced out by the amplifier's feedback circuit. The amplifier 148 is provided with a level shifter 150 to produce 10 volts full scale output to correspond to one microampere cell current. The output of the level shifter 150 is to the threshold detector and display circuit 142 and to the switch 144. The details of the circuit will be more fully described hereinafter.

The signal from the humidistat 30 can be used to correct for water vapor absorption which could interfer with the CO measurement. The reading of the humidistat combined with the temperature of the sample can be used to obtain the concentration of water vapor in the sample. The absorption at 4.6$\mu$m will be due to CO and $H_2O$. The extinction coefficients for these gases at 4.6$\mu$m using a bandpass filter have been measured to be about $3 \times 10^{-7}$ (ppm$^{-1}$ cm$^{-1}$) for CO and $3 \times 10^{-9}$(ppm$^{-1}$ cm$^{-1}$) for $H_2O$. At 75°F air saturated with water vapor has about 32,000 ppm $H_2O$. When two gases contribute to absorption at the same wavelength the equation relating transmitted intensity takes the form $$I/I_o = \exp\left[-(E_{CO}C_{CO}L + E_{H_2O}C_{H_2O}L)\right]$$

The E's are extinction coefficients, C's concentrations, and L's the sample pathlength. $I_o$ is the intensity transmitted with no absorption and I is that transmitted when absorption does take place. With a CO concentration of 50ppm and a pathlength of 100cm, the ratio $I/I_o = 0.989$. If the signal level $I_o$ were adjusted to read 10.000 volts, the transmitted signal would be 9.890 volts, or absorption would have caused a signal of 110 mvolts. Of this 110 mvolts, 95 mvolts is due to $H_2O$ and 15 due to CO. Knowledge of the $H_2O$ concentration and the extinction coefficient of $H_2O$ at 4.6$\mu$m allows the effect of $H_2O$ to be removed and a reading dependent only on the CO to be extracted. The circuit included in the water vapor correction amplifier 141 in FIG. 3 makes this correction.

The output of the threshold detection and display circuit 142 are to red and green indicator lamps 110 and 112 and to an audible warning signal horn 496. The outputs of the switch 144 are connected to a meter 108 by which an operator may selectively read the concentration of the compounds detected by the air gas monitor. Thermal control of the mine air monitor is desirable to inhibit condensation when the instrument is operated at the lower end of its operating ambient (−10°F) and to limit the temperature effect upon the absorption coefficient of the gases being monitored. Thus, a thermal control instrument 154 (FIG. 3) is provided which is described hereinafter in detail. The instrument 154 is heated and thermostatically controlled to operate at 90°F or above.

The power supply 156 (FIG. 3) can be either a.c. or d.c. If a.c. is used the power system has a power transformer to provide necessary power level and if d.c. is used an a.c. converter is used to interface with the monitor. As the power supply may take the form of any number of configurations well known to those skilled in the art no detailed description is provided.

Finally the mine air monitor is provided with a self-test system 158 which provides a zero to full-scale check for each channel. The test system may be operated by setting the test knob 114 on panel 104 to CAL.

To complete the disclosure of the preferred embodiment of the invention the electronic circuits including the control unit will be broken down for a detailed description.

Electronic Circuits

The Preamplifiers 118 and 126

Figure 4:
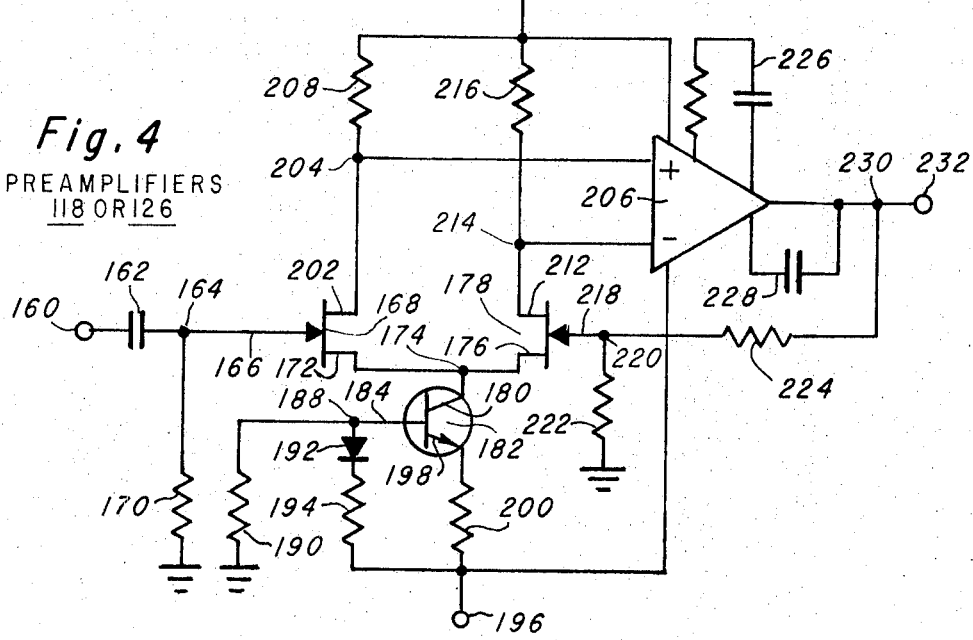
FIG. 4 is a schematic diagram of the low noise preamplifiers utilized in the embodiment of the invention.

The preamplifiers 118 and 126 (FIG. 4) which amplify the electrical signals of transducers 100 and 102 must have low noise and high input impedance characteristics. As they are identical in construction only one need be described. Each preamplifier 118 and 126 includes a low noise field effect transistor input stage optimally biased by a transistor current source to provide sufficient gain to power an operational amplifier. Feedback is then provided by a resistive divider from the output back to the inverting input of the field effect transistor. The circuit is from input terminal 160 coupled to an output of one of the detectors 100 or 102 (FIG. 1) to coupling capacitor 162 having one plate connected to junction 164 of gate 166 of field effect transistor 168 and of resistor 170 coupled to ground. Drain 172 is connected to junction 174 of drain 176 of field effect transistor 178 and of collector 180 of power transistor 182. Base 184 of power transistor 182 is connected to junction 188 of resistor 190 coupled to ground and of anode of diode 192. The cathode of diode 192 is connected through resistor 194 to a negative source of power at terminal 196. Emitter 198 of power transistor 182 is coupled through resistor 200 to the negative power source applied at terminal 196. Returning to field effect transistor 168, the source 202 of which is coupled to junction 204 of the positive terminal of operational amplifier 206 and of load resistor 208 which is coupled to a positive power supply source at terminal 210. Referring now to field effect transistor 178, its source 212 is connected to junction 214 of the negative terminal of operational amplifier 206 and of load resistor 216 connected to the positive power supply source at terminal 210. The gate 218 of field effect transistor 178 is connected to junction 220 of resistor 222 to ground and to feedback resistor 224 connected to the output of operational amplifier 206. Power is supplied the operational amplifier 206 from the negative and positive power sources applied at terminal 196 and 210. The operational amplifier 206 has an RC feedback circuit 226 which provides roll-off between first and second stages (not shown) of the operational amplifier 206. Additional roll-off is provided the operational amplifier by the capacitor feedback circuit 228 connected to the output of the operational amplifier 206 back across the second stage of the operational amplifier. The output of the preamplifier is to junction 230 of the feedback resistor 224 and of the output terminal 232. The numbers 232 and 232' shall be used respectively for the outputs of amplifiers which are selective inputs to the eight sample and hold circuits.

Synchronization Pickup and Control Unit

Figure 3:
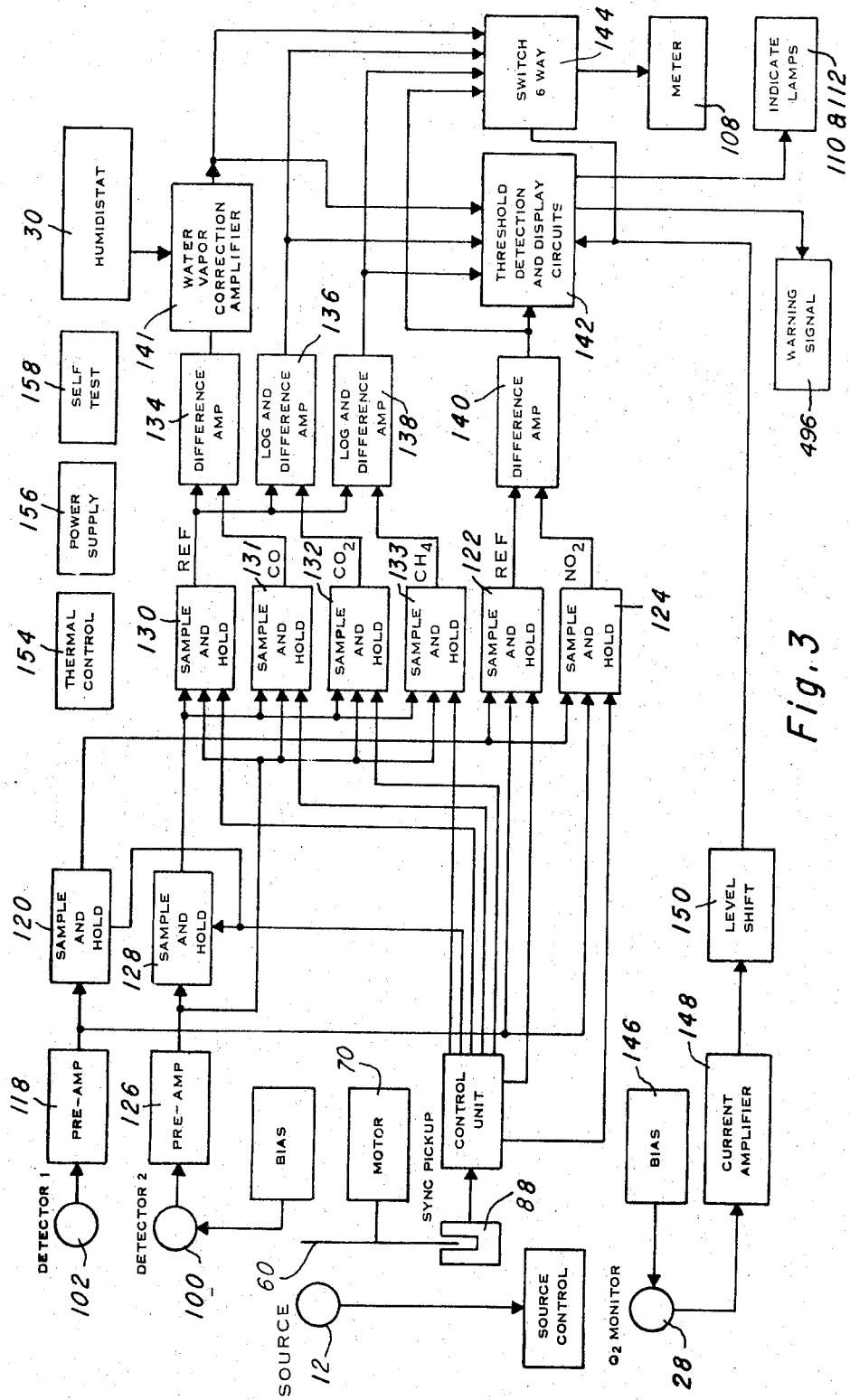
FIG. 3 is a block diagram of the electronics system including the oxygen and humidity auxiliary systems.
Figure 8:
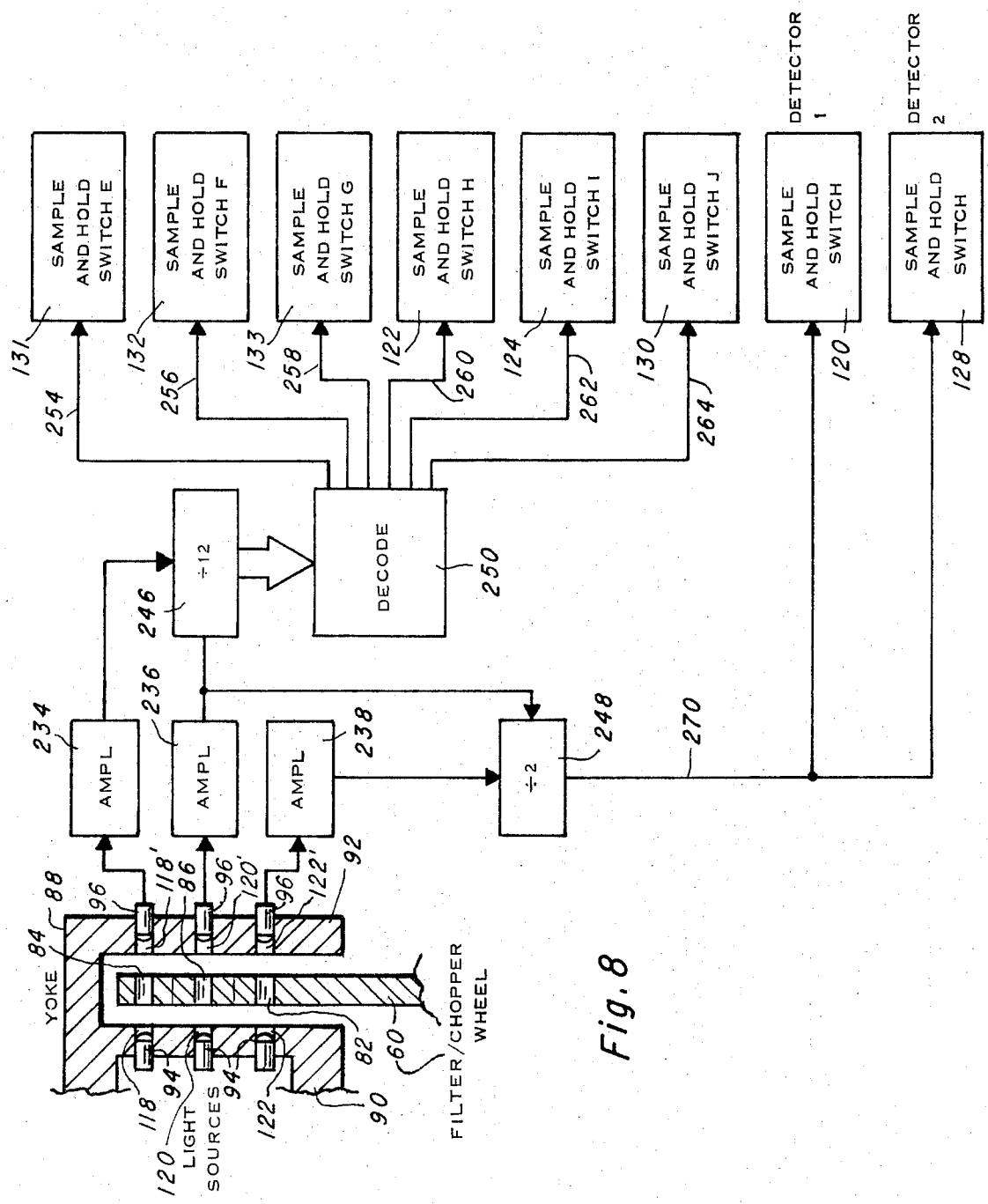
FIG. 8 is a partial sectional view of the filter/chopper wheel and yoke and a block diagram of the synchronous pickup and control unit.
Figure 10:
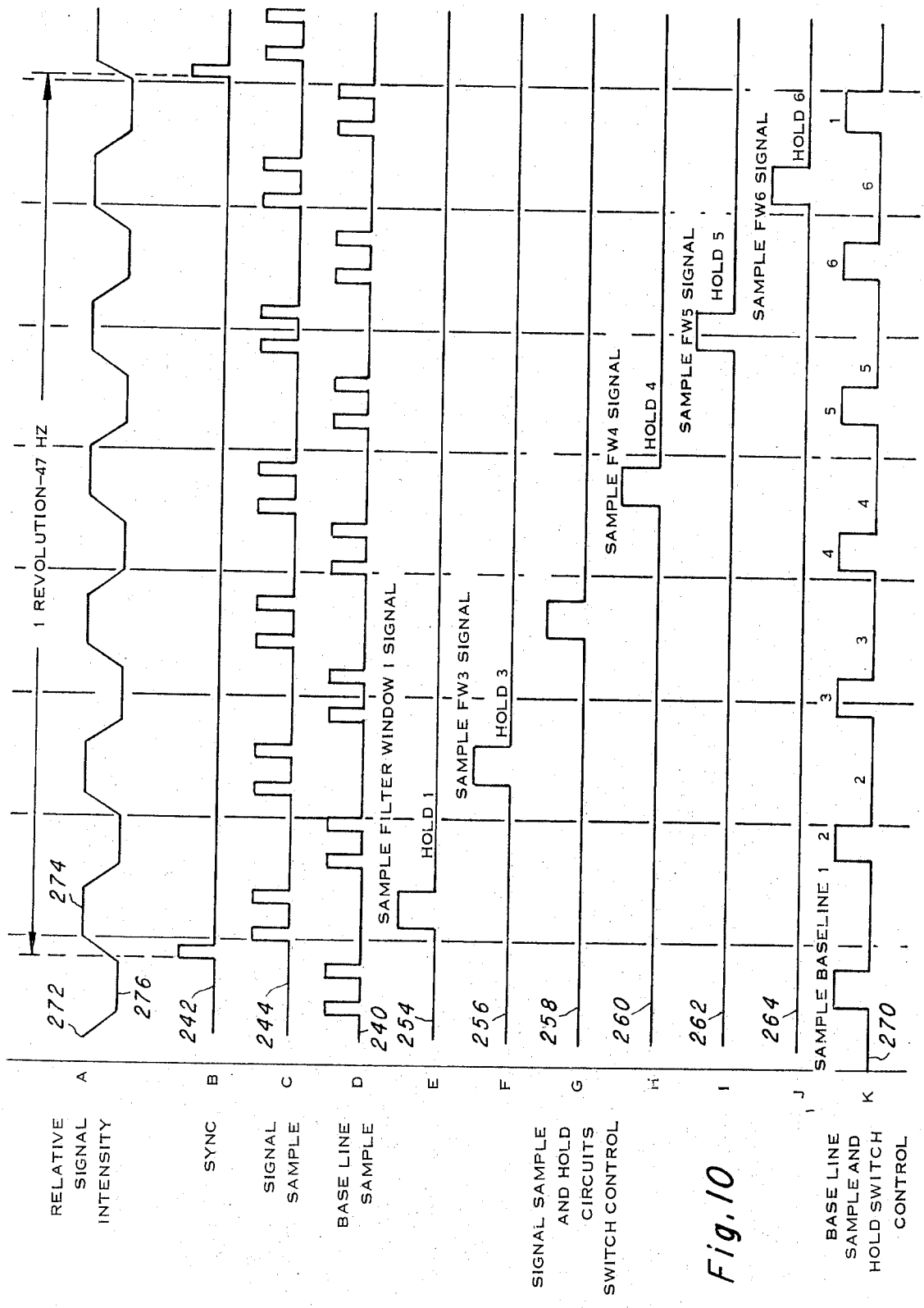
FIG. 10 is a diagram of the waveforms produced by and from the outputs of the synchronous pickup and control unit.

Seven control signals are provided to the eight sample and hold circuits of FIG. 3 to open and close their field effect transistor switches (FIG. 5) for passing the sample signals from the sample to the hold part of the circuit. Referring first to FIG. 8, the hole patterns 82, 84, and 86 of the filter/chopper wheel 60 are scanned by the light sources 94 as the wheel rotates producing light impulses to the transducers 96 which converts the light signals to electrical signals. The electrical signals are amplified by amplifiers 234, 236, and 238 and form respectively the waveform pulses 244, 242, and 240 (FIG. 10) which are used to produce the seven (7) control signals. The amplified output 244 of amplifier 234 (FIG. 8) is to a divide by 12 binary counter 246; the amplified output 240 of amplifier 238 is to a divide by 2 binary counter 248; and the amplifier output 242 of amplifier 236 is used to provide a synchronizing input once each revolution to the binary counters 246 and 248. The output of the divide by 12 counter 246 is to a decoder 250 whose outputs 254, 256, 258, 260, 262, and 264 (shown in waveform in FIG. 10) are to input terminals 268 of sample and hold circuits 131–133, 122, 124 and 130 respectively. The output 270 of the divide by 2 counter shown in waveform in FIG. 10 is to sample and hold circuits 120 and 128 which sample the detector outputs between filter window transmission or baseline positions. The synchronous inputs 242 to the counters 246 and 248 are to reset the counters once each complete revolution of the filter/chopper wheel 60. The waveform 272 represents the relative sampled signal strength as seen at the detectors 100 and 102. The filter window transmission signal for each filter 73–78 is represented by the high portion 274 and its corresponding base level by the low portion 276.

Figure 9:
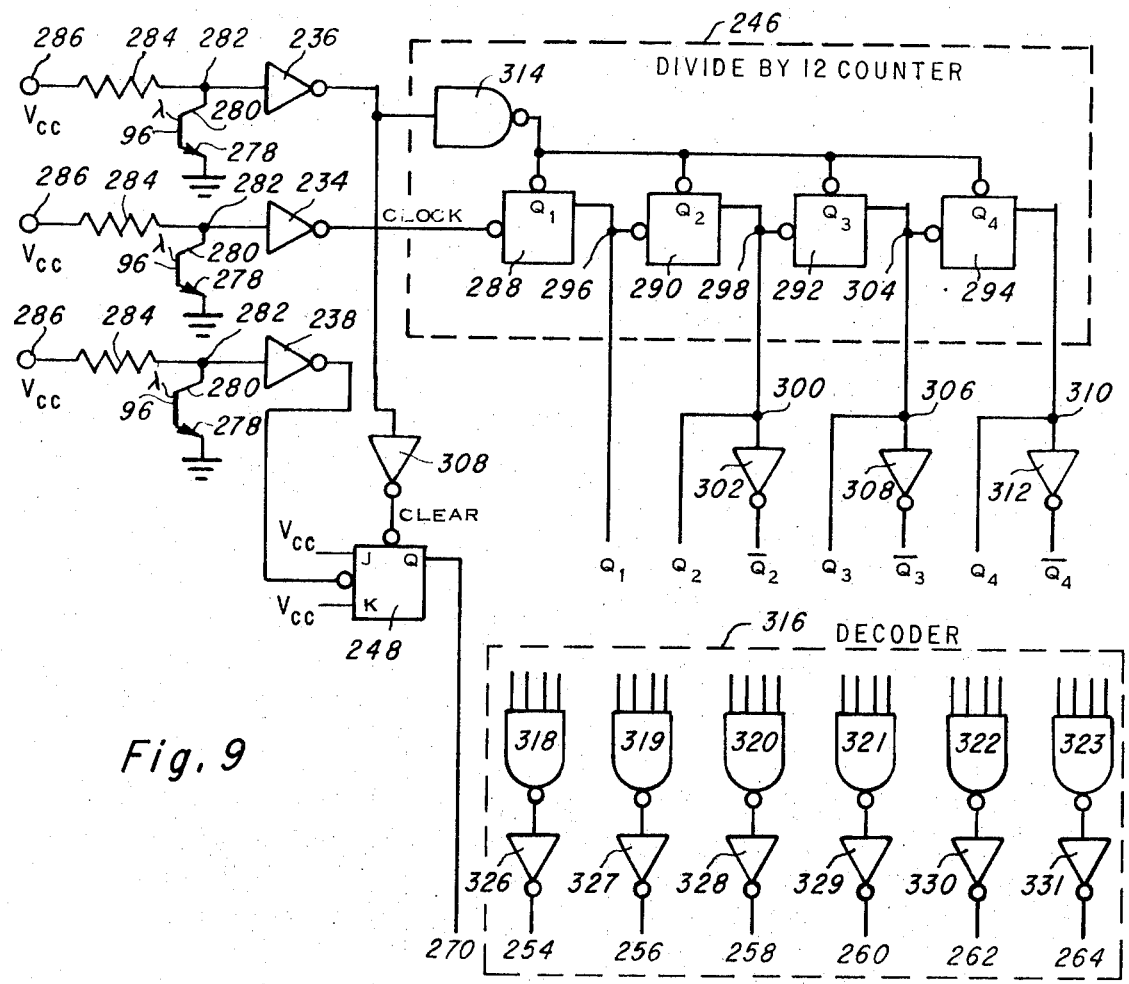
FIG. 9 is a schematic diagram of the synchronous pickup and control unit.

For a more detailed description of the synchronous pick-up and control unit reference is made to FIG. 9. The three transducers 96 may be, for example, photo-transistors having emitters 278 connected to ground, bases receiving light from sources not shown, and collectors 280 connected to junctions 282 of load resistors 284 coupled to positive power sources through terminals 286 and of inverter gates acting as amplifiers 234, 236, and 238. Normally, when no light impinges on the photo-transistors the input to the inverter gates 234, 236, and 238 is held at + 5 volt d.c. producing logic O outputs. When light strikes the photo-transistors the inverter gate inputs are taken to ground through the photo-transistors 96 causing the outputs to change to logic 1. When the light is removed the photo-transistors turn off causing the inverter inputs to go to +5 volt and the outputs go back to 0. The divide by 12 binary counter 246 may be, for example, a Texas Instruments 7493N integrated circuit which includes 4JK Flip-Flops 288, 290, 292, and 294 coupled in series as follows: the clock pulse terminal of flip-flop 288 is connected to the output of inverter amplifier 234; the output of flip-flop 288 is connected to junction 296 of the input terminal for flip-flop 290 and of output terminal Q1; the output of flip-flop 290 is to junction 298 of input terminal for flip-flop 292 and of junction 300 of terminal Q2 and of inverter 302 to terminal $\overline{Q2}$; the output of flip-flop 292 is to junction 304 of the input for flip-flop 294 and of junction 306 of Q3 terminal and of inverter 308 to $\overline{Q3}$ terminal; and the output of flip-flop 294 is to junction 310 of terminal Q4 and of inverter 312 to $\overline{Q4}$ terminal. The inverters 302, 308, and 312 may be those of a Texas Instruments 7404N Hex Inverter. The flipflops are reset each revolution of the filter/chopper wheel 60 (FIG. 1) by a synchronization pulse 242 produced by inverter amplifier 236 (FIG. 9) and applied to NAND gate 314 whose output is to the clear terminals of the four J-K flip-flops. The decoder 316 comprises six, four input NAND gates 318, 319, 320, 321, 322, and 323, respectively, feeding six inverter gates 326, 327, 328, 329, 330, and 331. The four inputs to NAND gate 318 are Q1, Q2, $\overline{Q3}$, and $\overline{Q4}$; to NAND gate 319 are Q1, Q2, $\overline{Q3}$, and $\overline{Q4}$; to NAND gate 320 are Q1, $\overline{Q2}$, Q3, and $\overline{Q4}$; to NAND gate 321 are Q1, Q2, Q3, and $\overline{Q4}$; to NAND gate 322 are Q1, $\overline{Q2}$, $\overline{Q3}$, and Q4; and to NAND gate 323 are Q1, $\overline{Q2}$, Q3, and Q4. The outputs of inverters 326-331 are respectively, waveform outputs 254, 256, 258, 260, 262, and 264 (FIG. 10)

Figure 5:
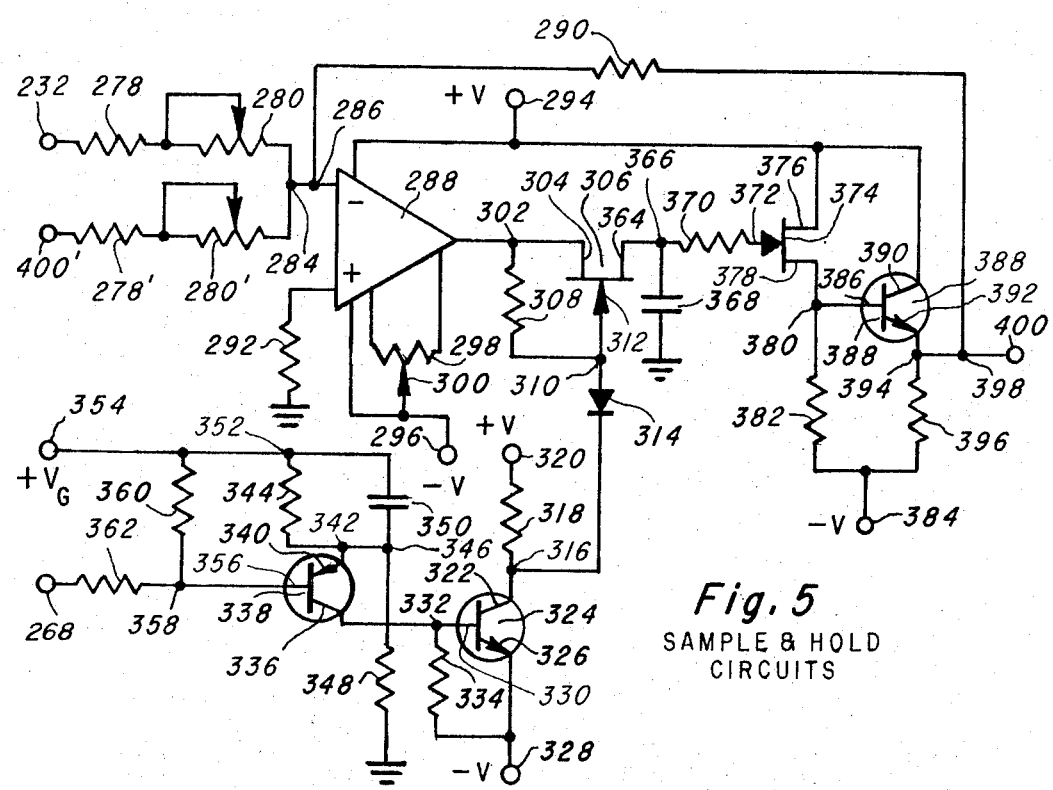
FIG. 5 is a schematic diagram of the sample and hold circuits utilized in the embodiment of the invention.

The divide by 2 counter 248 (FIG. 9) is a single JK flip-flop such as, for example, a Texas Instruments 7473N operated in a toggle mode. The JK flip-flop 248 receives as its input terminal the output pulses of inverter gate amplifier 238 and receives at its clear terminal the synchronization pulse output of inverter gate amplifier 236 through inverter 308. The Q output of the flip-flop produces the baseline sample and hold switch control waveform 270 (FIG. 10) coupled to sample and hold switching circuits 120 and 128 (FIG. 5).

Sample and Hold Circuits

The signal system hereinafter described is such that each signal is present only for a short time during each revolution of the filter/chopper wheel 60. In order to make use of the signal it must be stored away for later comparison with another measurement. Thus an analog storage circuit is used as shown in FIG. 5 and is called a sample and hold circuit. The air monitor as shown in FIG. 3 includes eight sample and hold circuits; however, as the construction of each circuit is identical only one is described. Basically the circuit (FIG. 5) includes a closed loop amplifier which upon receipt of an input signal stabilizes to an output voltage which is stored in a capacitor and thus held at the output. Each of the sample and hold circuits 120 and 128 (FIG. 3) include two input terminals—one for the preamplifier output 232 (FIG. 4), and the second for the control unit output 270. The sample and hold circuits 130–133, 122 and 124 have an additional input 400' which is the output of either of sample and hold circuits 120 and 128. The additional circuitry required for these circuits is identified by primed numbers in FIG. 5. Each input 232 and 400' (FIG. 5) is to a resistor 278 and 278' connected to the junction of the slider arm and resistor of potentiometer 280 and 280' which are connected together at junction 284. From junction 284 the circuit is to junction 286 (separated for clarity) of the negative terminal of amplifier 288 and of feedback resistor 290 of the closed loop of the sample and hold circuit. The positive terminal of the amplifier 288 is connected through resistor 292 to ground. Power is supplied the amplifier from a positive power source applied at terminal 294 and from a negative power source applied at terminal 296. Balance is provided the operational amplifier 288 through a potentiometer feedback circuit having a potentiometer 298 whose slider arm 300 is connected to the negative power source 296. The output of amplifier 288 is to junction 302 of drain 304 of switching field effect transistor 306 and of biasing resistor 308 coupled to junction 310 of gate 312 of field effect transistor 306 and of anode of diode 314. The cathode of diode 314 is connected to junction 316 of load resistor 318 connected to positive voltage supply at terminal 320 and of collector 322 bipolar transistor 324. Emitter 326 of transistor 324 is connected to a negative power source at terminal 328. The base 330 of transistor 324 is connected to junction 332 of resistor 334 coupled to the negative source of power at terminal 328 and of the collector 336 of bipolar transistor 338. The emitter 340 of transistor 338 is connected at junction 342 to one end of emitter resistor 344 and of junction 346 of resistor 348 to ground and of one plate of capacitor 350. The other end of resistor 344 and other plate of capacitor 350 are connected at junction 352 with a positive power source at terminal 354. The base 356 of transistor 338 is connected to junction 358 of base load resistor 360 connected to the positive power source terminal 354 and of resistor 362 connected to control circuit output terminal 270. Returning now to the switching field effect transistor 306, its source is coupled to junction 366 of hold capacitor 368 to ground and resistor 370 connected to the gate 372 of field effect transistor 374. The source 376 of transistor 374 is connected to the positive voltage source at terminal 294 and the drain 378 is connected to junction 380 of resistor 382 connected to a negative power source at terminal 384 and of base 386 of transistor 388. The collector 390 of transistor 388 is connected to the positive voltage source at terminal 294 and its emitter 392 is coupled to junction 394 of resistor 396 connected to the negative power source terminal 384 and of output junction 398 of the closed loop resistor 290 and of output terminal 400.

Difference Amplifiers Schematic

Figure 6:
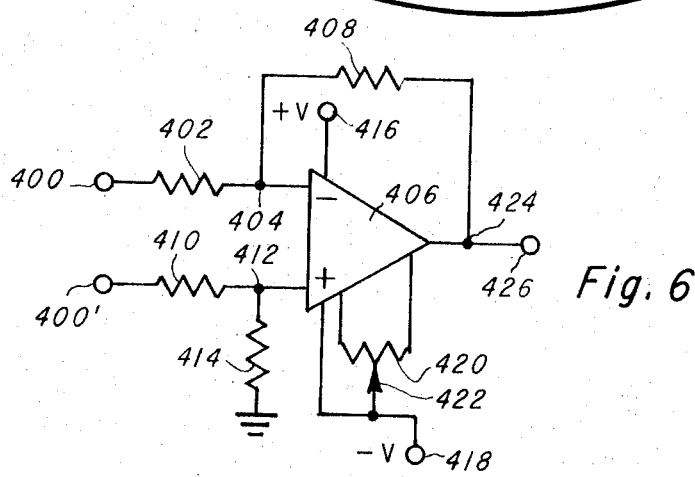
FIG. 6 is a schematic diagram of the difference amplifiers utilized in the embodiment of the invention.

The outputs 400 of the reference and $NO_2$ sample and hold circuits 122 and 124 (FIG. 3) are to difference amplifier 140, and the outputs 400 of the reference and CO sample and hold circuits 130 and 131 are to difference amplifier 134. Difference amplifiers 134 and 140 (FIG. 6) used in determining the concentration of carbon monoxide (not corrected for water vapor interference) and nitrogen dioxide are identical in construction and only one need be described. For example, a reference signal (FIG. 6) from sample and hold circuit 122 is applied to input terminal 400 coupled to resistor 402 which is connected to junction 404 of negative terminal of difference amplifier 406 and of feedstock resistor 408. In this example, the sample signal of sample and hold circuit 124 is applied to input terminal 400' connected to resistor 410 which is connected to junction 412 of resistor 414 to ground and of the positive terminal of difference amplifier 406. Power is supplied the difference amplifier 406 from a positive power source applied at terminal 416 and from a negative power source applied at terminal 418. The primary requirement of this amplifier is low off-set, thus a feedback circuit having an adjustment potentiometer 420 with its slider arm 422 connected to the negative power source at terminal 418 is provided. The output of difference amplifier 406 is to junction 424 of feedback resistor 408 and output terminal 426.

Log/Difference Amplifiers

Figure 7:
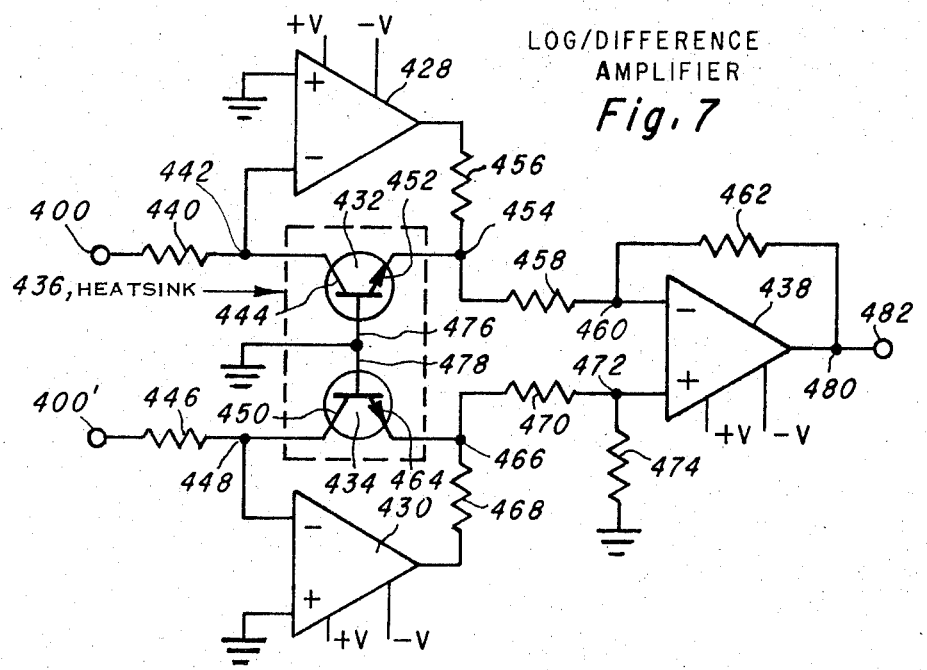
FIG. 7 is a schematic diagram of the log/difference amplifiers utilized in the embodiment of the invention.

The outputs 400 of the reference and $CO_2$ sample and hold circuits 130 and 132 are to log and difference amplifier 136; and the outputs 400 of the reference and $CH_4$ sample and hold circuits 130 and 133 are to log and difference amplifier 138 (FIG. 3). The outputs of the log and difference amplifiers 136 and 138 are signals proportional to the concentrations of $CO_2$ and $CH_4$. As each of the log and difference amplifiers 136 and 138 are identical in construction only one need be described in detail. In the preferred arrangement (FIG. 7) each log and difference amplifier comprises two long amplifiers 428 and 430; one receives the reference signal and the other receives the component sample signal. The feedback circuits of the log amplifiers 428 and 430 include silicon transistor feedback elements 432 and 434 which give the log characteristics; these elements are predictably temperature sensitive and appropriate for the embodiment of the invention if the transistor current is kept below the region where bulk resistivity becomes significant. The two transistor feedback elements 432 and 434 are carefully mounted on a heatsink 436 so that their temperatures are identical thereby assuring that their characteristics will track with temperature. Thus, the feedback applied to the log amplifiers 428 and 434 both change in the same direction an identical amount and are being subtracted by a difference amplifier 438. The end result is an effective compensation for thermal changes. The circuit is as follows: the reference signal is applied to input terminal 400 connected to resistor 440 which is coupled to junction 442 of the negative input terminal of log amplifier 428 and of collector 444 of feedback transistor 432. The positive terminal of log amplifier 428 is coupled to ground. The $CO_2$ or $CH_4$ sample signal is connected to terminal 400' which is connected to resistor 446. The resistor 446 is connected to junction 448 of negative input terminal of log amplifier 430 and to the collector 450 of feedback transistor 434. The positive terminal of log amplifier 430 is connected to ground. Emitter 452 of transistor 432 is connected to junction 454 of resistor 456 coupled to the output of log amplifier 428 and of resistor 458. Resistor 458 is connected to junction 460 of feedback resistor 462 and of the negative terminal of difference amplifier 438. Emitter 464 of transistor 434 is coupled to junction 466 of resistor 468 coupled to the output of log amplifier 430 and of resistor 470. Resistor 470 is connected to junction 472 of resistor 474 to ground and to the positive terminal of difference amplifier 438. Base 476 of transistor 432 and base 478 of transistor 434 are connected to a common ground. The output of difference amplifier 438 is to junction 480 of feedback resistor 462 and to output terminal 482.

Threshold Detection and Display Circuits

Figure 2:
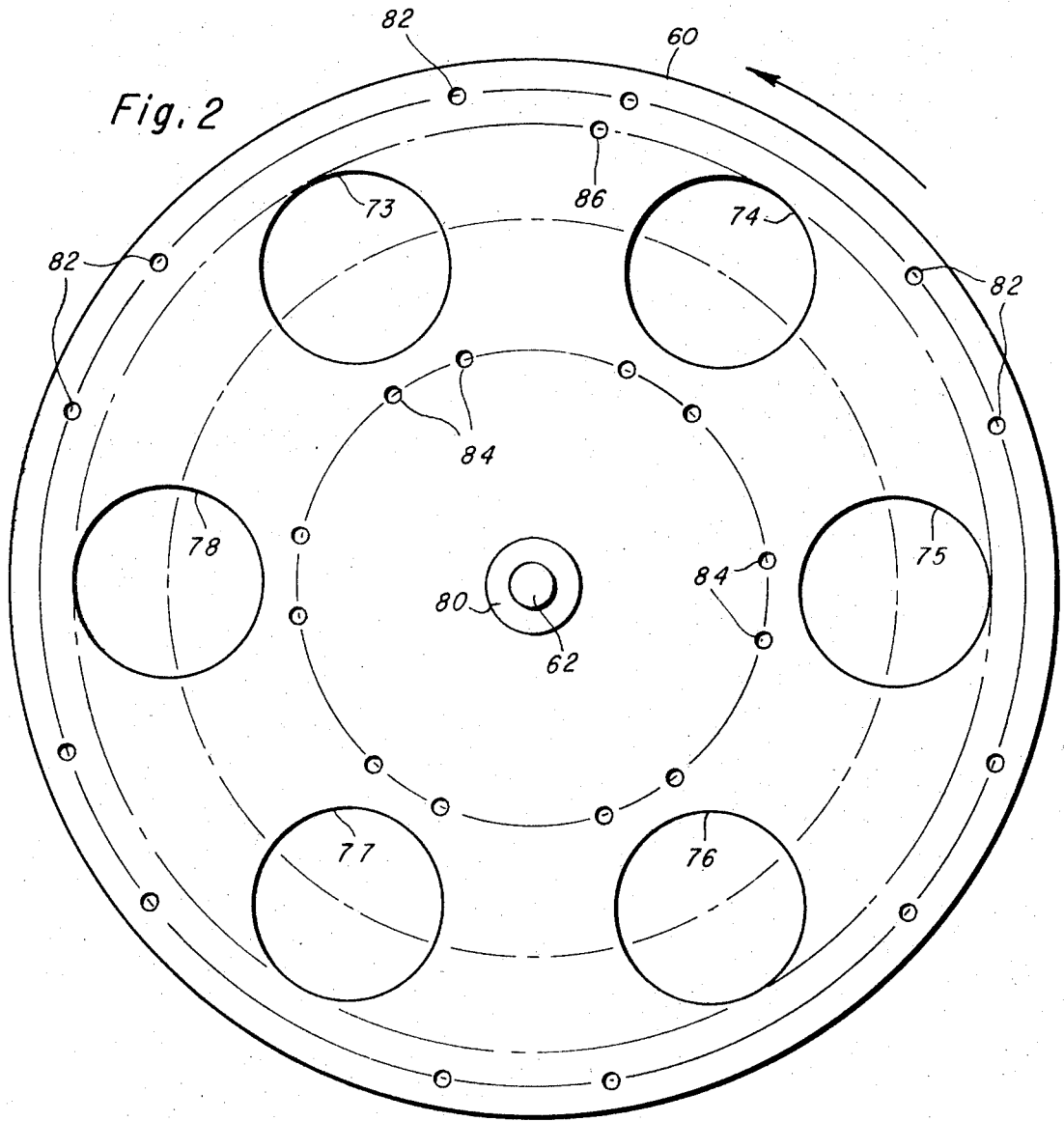
FIG. 2 is a front elevational view showing the arrangement of filter/chopper wheel.
Figure 12:
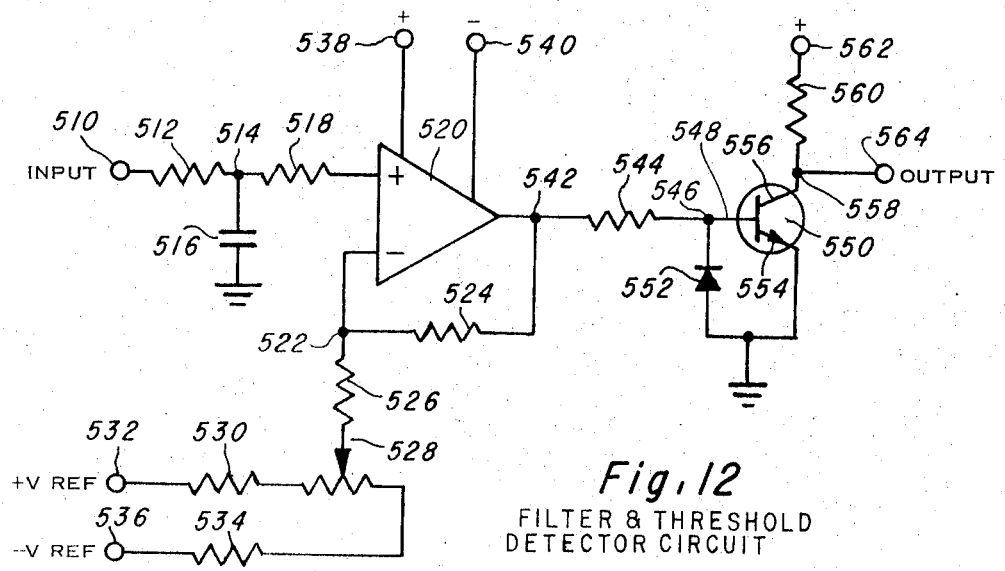
FIG. 12 is a schematic diagram of the filter and threshold detector circuits.
Figure 11:
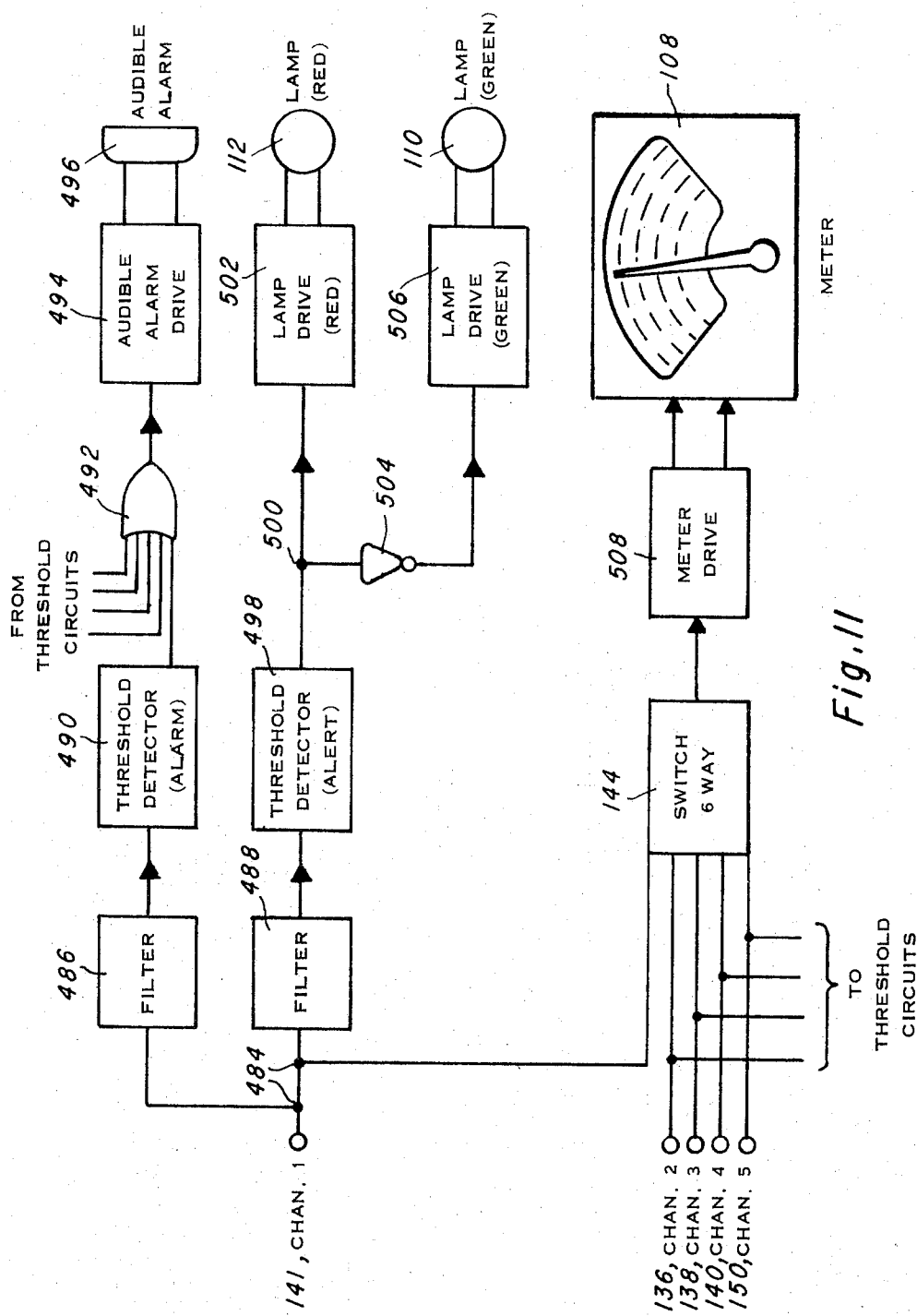
FIG. 11 is a block diagram of the filter, threshold detection, and display circuits.

The threshold detection and display circuit (FIGS. 3 and 11) includes channels 1 through 5 for monitoring the concentration of carbon monoxide, carbon dioxide, methane, nitrogen dioxide, and oxygen the concentration signals of which are received respectively from difference amplifier 134 and water vapor correction amplifier 141, log difference amplifier 136, log difference amplifier 138, difference amplifier 140, and level shifter 150 of the oxygen monitor circuit. As all of the circuits are identical only one need be described together with its relationship to the remaining channels. FIG. 11 is a block diagram of a typical threshold detection and display circuit which also discloses its relation to the remaining channels. A concentration signal is applied to junction 484 of filter 486 for a threshold detector alarm circuit 490, of filter 488 for a threshold detector alert signal, and of a pole of a six way meter switch 144. The filters 486 and 488 are to filter out any spurious noise from the signal to prevent either the sounding of the alarm of the lighting of a red lamp prematurely. The output of filter 486 is through a threshold detector 490 to an input of a five input OR gate 492. The OR gate also receives as inputs the alarm signals from the remaining four channels; a signal from any of the five alarm detectors is passed from the five input OR gate to an audible alarm drive circuit 494 which drives an audible alarm 496. The output of filter 488 is to a threshold detector for an alert system 498. An alert signal is passed to junction 500 of a red lamp drive circuit 502 for a red lamp 112 and of an inverter 504 having its output connected to a green lamp drive circuit 506 for a green lamp 110. It will be understood that there will be five red and five green lights—one of each for each of the five channels. The six way switch 144 receives as inputs the concentration signals of the five channels and an operator may turn off the switch (FIG. 1) or selectively couple any of these concentration signals to a meter drive circuit 508 whose output may be read from the meter 108 (FIG. 1). FIG. 12 discloses in detail, for the channels, one of the two filters and threshold detector circuit 490 and 498 of FIG. 11; five channels it will be recalled are used in the system. The filters 486 and 488 are RC filters each of which consist of an input terminal 510 connected to resistor 512 connected to junction 514 of capacitor 516 to ground and of resistor 518 coupled to the positive terminal of the amplifier 520. A negative terminal of amplifier 520 is connected to junction 522 of a feedback resistor 524 and of resistor 526 connected to the arm of potentiometer 528. The potentiometer resistor 528 has one end connected to a resistor 530 connected to a positive voltage reference at terminal 532 and its other end connected to resistor 534 connected to a negative voltage reference at terminal 536. The threshold value of amplifier 520 is set by adjusting the potentiometer 528 which is connected to the stable reference supplies. Power is supplied the amplifier from a source of positive and negative supply voltages applied at terminals 538 and 540, respectively. The output of amplifier 520 is to junction 542 of feedback resistor 524 and coupling resistor 544 connected to junction 546 of the base 548 of transistor 550 and of the cathode of a diode 552 having its anode connected to ground. The emitter 554 of transistor 550 is connected to ground and the collector 556 is connected to junction 558 of load resistor 560 connected to a positive power source at terminal 562 and to output terminal 564.

The drive circuits for the audible alarm 496 and red and green lamps 110 and 112 of FIG. 11 are identical; therefore, only one need be described in detail. As shown in FIG. 11 the inputs to the drive circuits are from either the five input OR gate 492 of the alarm system or the red and green signals of the alert threshold detector 498. The input terminal 564' (FIG. 13) is to resistor 566 connected to junction 568 of resistor 570 to ground and of base 572 of transistor 574. Collector 576 of transistor 574 is connected to resistor 578 connected to a positive power supply at terminal 580. The emitter 582 of transistor 574 is connected to the base 584 of the transistor 586. The emitter 588 of transistor 586 is connected to ground. The collector 590 of transistor 586 is coupled through load 592, which will be either the audible alarm 496 or the red (112) or green (110) lamps of FIG. 11, to the positive power terminal 580.

The meter switch and drive circuitry for the five channels of FIG. 11 is shown in FIG. 14. Channels 1 through 5 are connected to poles of the six way switch 144; the sixth pole or meter off pole position is connected to ground. The channel poles of switch 144 are connected through resistor 594 to a potentiometer 596. The slider 598 of the potentiometer 596 is connected to junction 600 of potentiometer resistor 602, of resistor 604 coupled to ground and of junction 606 (shown separated from junction 600 for clarity) of meter 108 and of gate 608 of field effect transistor 610. The drain 612 of field effect transistor 610 is coupled to a negative power source at terminal 614 and source 616 of field effect transistor 610 is coupled to junction 618 of the negative terminal of amplifier 620 and of resistor 622 coupled to a positive voltage source at terminal 624. Positive terminal of amplifier 620 is connected to junction 626 of resistor 628 connected to the positive power source at terminal 624 and source electrode 630 of field effect transistor 632. The drain 634 of field effect transistor 632 is connected to a negative power source at terminal 636 and gate 638 is connected through resistor 640 to the arm of potentiometer 642. Potentiometer resistor 644 of the potentiometer 642 has one end connected through resistor 646 to a positive voltage reference source at terminal 648 and its other end connected through resistor 650 to a negative voltage reference source at terminal 652. Returning to the amplifier 620, power is supplied the amplifier 620 from sources of positive and negative supply voltages applied at terminals 654 and 656 respectively. The output of amplifier 620 is to resistor 658 connected to meter 108. The potentiometer 642 is used initially to set the meter to zero (or adjust the amplifier off-set), and potentiometer 596 is adjusted initially to obtain full-scale meter reading for maximum input signal which for the system described is 10 volts.

Transimpedance Amplifier Schematic for the Oxygen Detector Cell

The electro-chemical galvanic cell 28 (FIG. 15) is biased by a positive source of d.c. power such as a battery 146 having its negative terminal coupled to ground. The output of the electro-chemical galvanic cell 28 is to junction 660 of feedback resistor 662 and of negative terminal of amplifier 148. The positive terminal of amplifier 148 is connected to ground and a potentiometer 664, having its arm connected to a negative power source at terminal 666, is used to adjust the gain of the amplifier to zero. The output of amplifier 148 is to junction 668 of feedback resistor 662 and one end of resistor 669, the other end of resistor 669 being connected to junction 670, feedback resistor 684 and negative terminal of amplifier 674 of the level shifter 150 (FIG. 3). The positive terminal of amplifier 674 is coupled to resistor 676 to ground. The amplifier 674 is provided with an adjustment potentiometer 678 having its arm connected to a negative source of power at terminal 680. The output of amplifier 674 is connected to junction 682 of feedback resistor 684 and of output terminal 686. The output of the level shifter 150 is through output terminal 686 to the threshold detection and display circuit 142.

Chassis Temperature Control

To alleviate the effects of temperature change on the mine air monitor, the system has been designed for optimum operation at a minimum temperature of 90°F. Thus the monitor housing 2 (FIG. 1) will be maintained at a minimum temperature of 90°F by a plurality of strip heaters which will be driven and controlled by the circuitry shown in FIG. 16 in which is provided a thermistor 688 having one end coupled through resistor 720 to the positive terminal of voltage supply 706 and its other end to junction 690 of the collector 692 of a constant current transistor 694 and junction 696 of feedback resistor 698 and of negative terminal of amplifier 700. The emitter 702 of transistor 694 is connected to resistor 704 connected to the negative terminal of a ± 15 a.c. volt supply 706. Base 708 of transistor 694 is connected to junction 710 of resistor 712 which is coupled to ground through variable resistor 714 and of the cathode of diode 716 whose anode is connected through resistor 718 to the negative terminal of the a.c. voltage supply 706. Returning now to the operational amplifier 700, its positive terminal is connected through resistor 726 to ground. To adjust the gain of the operational amplifier 700, a potentiometer 724 having its arm coupled to the positive terminal of the voltage supply 706 is coupled across the first and second stages of the operational amplifier 700. The output of operational amplifier 700 is to junction 728 of latching feedback resistor 698 and one end of resistor 730. The other end of resistor 730 is connected to junction 732 of the cathode of zerner diode 734 having its anode coupled to ground and of the negative terminal of NAND gate 736. The positive terminal of NAND gate 736 receives a series of positive pulses produced as the differentiated and clipped output of comparator amplifier 738 receiving power and inputs from the a.c. voltage supply 706. The circuit is as follows: a center tapped coil 740 with the center tap grounded is connected to the voltage supply 706 to provide positive half waves to resistor 742 connected to junction 744 of resistor 746 to ground and of the negative terminal of amplifier 738. The positive terminal of amplifier 738 is connected through resistor 741 to ground. A negative source of power is provided the amplifier 738 from the negative terminal of a.c. voltage supply 706. A positive source of power is provided the amplifier through junction 748 of resistor 750 to the positive terminal of the a.c. voltage supply 706 and of clamp junction 752 of the cathode of zener diode 754 having its anode grounded and of capacitor 756 to ground. The output of comparator amplifier 738 is to a differentiator and clipper comprising capacitor 758 connected to the junction 760 of the positive terminal of NAND gate 736 and of junction 762 of resistor 764 to ground and cathode of diode 766 having its anode grounded. The NAND gate 736 output provides a trigger pulse to base 768 of transistor 770. The emitter 772 of transistor 770 is connected to resistor 774 connected to a positive voltage source at terminal 776. The collector 778 of transistor 770 is connected to the positive end of a primary winding 780 of pulse transformer 782. The negative end of winding 780 is connected through resistor 784 to ground. Secondary winding 786 of pulse transformer 782 has its negative end connected to one element of a triac 788 and its positive end to junction 790 of terminal 792 of a 115V a.c. voltage source and to another element of triac 788. The output of triac 788 is through heater resistor 794 to terminal 796 of the 115V a.c. voltage source. In this arrangement the a.c. power will be applied to the heater 794 only at zero crossings of the a.c. line thereby eliminating current transients and RF interference within the power supply.

Lead Selenide Photoconductor Temperature Control

Detector 100 (FIG. 1) may be, for example, a lead selenide photoconductive detector and consists of a photoconductive cell, a thermal electric cooler, and a thermistor. This cell will detect light intensity and for proper operation it must be cooled and stabilized at a constant temperature. The thermal electric cooler provides cooling for the detector and is regulated by a thermistor (FIG. 17) mounted near the detector to monitor its temperature to control the detector temperature. The circuit for the detector temperature control is shown in FIG. 17. A source of d.c. is obtained from an alternating current source in a conventional manner; that is, a.c. is connected to transformer 798 of a full-wave rectifier through terminals 800 and 802. The secondary coil 804 is center tapped to ground. The positive terminal of the upper half of winding 804 is connected to junction 806 of the emitter 808 of transistor 810 and one end of resistor 816. The other end of resistor 816 is connected to the base 824 of transistor 822. The negative terminal of the lower half of winding 804 is connected to junction 818 of the emitter 820 of transistor 822 and one end of resistor 814. The other end of resistor 814 is coupled to the base 826 of transistor 810. Collector 828 of transistor 810 is connected to junction 830 of collector 832 of transistor 822 and filter junction 834 of capacitor 836 to ground and one end of coil 838. The other end of coil 838 is connected to junction 840 of capacitor 842 to ground and of junction 844 of cooler 846 and the collector 848 of impedance matching transistor 850. The base 852 of transistor 850 is connected to a thermistor controlled circuit which includes a bridge 854 having a thermistor 856 having one end coupled to junction 858 of resistor 860 connected to positive power source at terminal 862 and to one end of bridge resistor 864. Bridge resistor 864 has its other end connected to junction 866 of the negative feedback circuit of amplifier 868 and to one end of bridge resistor 870. Bridge resistor 870 has its other end connected to junction 874 of resistor 874 connected to negative source of power at terminal 876 and one end of bridge resistor 878 having its other end connected to junction 880 of thermistor 856 and of the positive terminal of amplifier 868. The thermistor 856 being placed in the resistance bridge, the bridge detects its resistance change with temperature and this change is amplified by the amplifier 868. Power is supplied the amplifier 868 from the positive and negative power sources applied at terminals 862 and 876. Adjustment of the amplifier is provided by potentiometer 882 having its slider arm connected to the negative power source at terminal 876. The output of amplifier 868 is to junction 884 of resistor 886 and of feedback junction 888 of one end of resistor 896 and one plate of capacitor 892. The other end of resistor 896 and other plate of capacitor 892 are joined at junction 894 of bridge junction 866 and negative terminal of amplifier 868. Continuing from the other end of resistor 886, it is connected to junction 897 of the anode of diode 898 having its cathode grounded and of base resistor 900 connected to the base 852 of transistor 850. The emitter 902 of transistor 850 is connected to junction 904 of resistor 906 to ground and of base 908 of transistor 910. The emitter 912 of transistor 910 is connected to ground and the collector 914 is connected to junction 916 of transistor 918 to ground and the thermal electric cooler 846.

In operation the mine air monitor is positioned in a mine shaft and the exhaust fan 58 actuated to draw air to be sampled through the sample chamber 6. The light source 12 is actuated to send infrared (IR) and visible light through the air sample by way of the White optical system 18 contained in the sample chamber 6 to the filter/chopper wheel 60 containing a visible light reference filter 73 and an IR reference filter 77 and CO, $CO_2$, $NO_2$, and $CH_4$ detection filters 74, 75, 76, and 78. The filter/chopper wheel 60 is rotated 47 times per second to provide a sampling frequency of 47 Hz for each filter and portions of the filter/chopper wheel 60 between each filter. Once each revolution the visible light reference filter 73 and the IR reference filter 77 transmit the visible light and IR light passing through the air sample; the component filters transmit light in the strong absorption bands of the components of the air sample to be measured; and portions of the filter/chopper wheel 60 between each filter, acting as blackbodies, transmit energy solely as a function of temperature. The filter/chopper wheel energy transmissions are to a beamsplitter which reflects the visible light to a visible light detector 102, and passes the infrared light to an IR detector 100. The visible and IR detectors generate electrical outputs for circuits which are controlled or multiplexed by signals generated by the control unit which counts and decodes electrical pulses generated by light detectors receiving, from light sources, light passing through apertures formed in the filter/chopper wheel 60.

The control unit produces waveforms 254, 256, 258, 260, 262, 264, and 270 for sampling respectively the filters and baseline portion of the chopper wheel as follows. During the first square wave pulse of waveform 270, the filter/chopper wheel 60 is sampled by sample and hold (S & H) circuit 128 and a baseline voltage is held at one input of S & H circuit 131; then, during the square wave pulse of waveform 254, the CO filter 74 is sampled at another input of S & H circuit 131 and an adjusted CO voltage; i.e., a voltage equal to the difference of the CO filter and baseline voltages, is held at one input of difference amplifier 134. During the second square wave pulse of waveform 270, the filter/chopper wheel 60 is sampled by S & H circuit 128 and a baseline voltage is held at one input of S & H circuit 132; then, during the square wave pulse of waveform 256, the $CO_2$ filter 75 is sampled at another input of S&H circuit 132 and an adjusted $CO_2$ voltage is held at one input of log and difference amplifiers 136. During the third square wave pulse of waveform 270, the filter/chopper wheel 60 is again sampled by S & H circuit 128 and a baseline voltage is held at one input of S & H circuit 133; then, during the square wave pulse of waveform 258, the $CH_4$ filter 76 is sampled at another input of S & H circuit 133 and an adjusted $CH_4$ voltage is held at one input of log and difference amplifiers 138. During the fourth square wave pulse of waveform 270, the filter/chopper wheel 60 is again sampled by S & H circuit 120 and a baseline voltage is held at one input of S & H circuit 122; then, during the square wave pulse of waveform 260, the visible light reference filter 77 is sampled at another input and an adjusted visible light reference voltage is held at one input of difference amplifier 140. During the fifth square wave pulse of waveform 270, the filter/chopper wheel 60 is again sampled by S & H circuit 120 and a baseline voltage is held at one input of S & H circuit 124; then, during the square wave pulse of waveform 262, the $NO_2$ filter 77 is sampled at another input to S & H circuit 124 and an adjusted $NO_2$ voltage is compared with the visible light reference voltage by the difference amplifier 140 and a $NO_2$ voltage is produced which is proportional to the concentration of $NO_2$ in the air sample. And finally, during the sixth square wave pulse of waveform 270, the filter/chopper wheel is again sampled by S & H circuit 128 and a baseline voltage is held at one input of S & H circuit 130, then during the square wave pulse of waveform 264, the IR reference filter 73 is sampled at another input of S & H circuit 130 and an adjusted IR reference voltage is applied to other inputs of difference amplifier 134 and at log and difference amplifiers 136 and 138. Difference amplifier 134 compares the IR reference voltage with the CO voltage and produces a voltage proportional to the CO concentration (not corrected for $H_2O$ vapor interference) of the air sample. Similarly the log and difference amplifiers 136 and 138, respectively, compare the $CO_2$ and $CH_4$ voltages with the IR reference voltage and produce voltages proportional to $CO_2$ and $CH_4$ concentrations of the air sample. The CO concentration voltage may be fed to water vapor adjusted amplifier 141 and adjusted for humidity conditions of the air sample at this stage.

The CO, $CO_2$, $CH_4$, and $NO_2$ signals together with the oxygen signal of the electro-galvanic cell 28 are detected by the threshold and display circuits 142 and six-way meter switch 144. If the voltage of any one of these components exceeds the critical value of its threshold detector an audible alarm is sounded and a red light is actuated to designate the component or components-green lights are used to indicate normal conditions. The concentrations of the components may be selectively displayed on the meter by manipulating the six-way meter switch.

Various changes can be made in the above constructions, and circuits constituting the embodiments of the invention without departing from the scope of the invention as defined by the appended claims.

What is claimed is:

1. A device for monitoring a fluid sample comprising:
   a. a compartmentalized housing including compartments for a sample signal electronic processing circuit including an alarm means and sample concentration indicating meter and an infrared source, a sampling chamber, a detector means and optics package, and a power supply, said sampling chamber including an intake means for continuously drawing a fluid sample into the chamber and an exhaust means for continuously exhausting the fluid sample from the chamber;
   b. an infrared source mounted in the electronic processing circuit compartment of said housing, said infrared source being shielded from the electronic processing circuit;
   c. a multipass mirror system mounted in the sampling chamber of said housing in the path of electromagnetic energy emanating from the source to form an optical path of selected length through an optics package to a detector, said selected length of the optical path providing increased absorption of the electromagnetic energy;
   d. an optics package mounted in said detector means and optics package compartment of said housing, said optics package including a rotatable filter/chopper wheel and means for rotating the filter/chopper wheel, said filter/chopper wheel including a plurality of filters operative in the infrared frequency range, a plurality of filters operative in the visible frequency range, and a reference filter, said plurality of filters equally spaced one from the other and from the center of the wheel and mounted in apertures provided therefor in the wheel, the portion of said wheel between filters forming a base line sampling area, said plurality of filters having diameters such that the aperture of energy impinging thereon is approximately one-third the diameter of the filter whereby sampling is at the top of a square wave or spike-flat top control signal with those filters operative in the infrared frequency range having half intensity widths of 1.5 micron, and those operative in the visible frequency range having half intensity widths ± 15A about the strong absorption wavelengths for component filters and the nonabsorbing region of the reference filter, a plurality of start and stop apertures formed in the filter/chopper wheel some adjacent the wheel periphery and some adjacent the wheel center, said apertures adjacent the wheel periphery being positioned in pairs between each filter to provide timing signals for base line sampling prior to sampling the following filter and said apertures adjacent the wheel's center being positioned in pairs in relation to each filter to provide start and stop signals for sampling the filters and a synchronization aperture for resetting the control electronics each revolution of the filter/chopper wheel, and a bifurcated yoke means through which the filter/chopper wheel extends, said yoke means including in one bifurcation light sources and in the second bifurcation light detector means operative in response to light passing through the filter/chopper wheel apertures to produce electrical signals for operational control;

e. a detector means mounted in the detector/optics compartment of the housing in the optical path for the infrared energy, said detector means including a beamsplitter for reflecting visible light to a first detector and transmitting infrared energy to a second detector, said detectors operative to produce electrical signals responsive, respectively, to received light and infrared energy;

f. an electronic signal processing circuit mounted in the electronic signal processing circuit compartment of the housing comprising a plurality of sample and hold circuits and a control unit including a multiplexer, said plurality of sample and hold circuits operative responsive to the multiplexer control signals of the control unit to sample the detector outputs for each of the filter outputs, a plurality of difference amplifiers selectively coupled to the outputs of the sample and hold circuits for differencing between sample signals and reference signals to produce signals representative of the samples concentrations; threshold and detection channel circuits having inputs coupled to the difference amplifiers, and monitoring means including an alarm coupled to the channel outputs for selectively monitoring the sample concentrations; and g. a power supply mounted on the power supply compartment electrically coupled to power the electrical components and circuits including the infrared source, sampling chamber intake and exhaust means, and the electronic signal processing circuit.

2. A device for monitoring a fluid sample according to claim 1 further comprising an alarm means operably responsive to a selected sample concentration signal.

3. A device for monitoring a fluid sample according to claim 1 further comprising a housing temperature control mechanism for maintaining the device at a selected temperature for optimum operation.

* * * * *